United States Patent
Tomura et al.

(10) Patent No.: US 10,254,630 B2
(45) Date of Patent: Apr. 9, 2019

(54) OPTICAL DRIVING APPARATUS, OPTICAL APPARATUS, AND OPTICAL DRIVING PROGRAM

(71) Applicant: CANON KABUSHIKI KAISHA, Tokyo (JP)

(72) Inventors: Kaori Tomura, Inagi (JP); Hideomi Nakagami, Saitama (JP); Koji Sato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 15/367,761

(22) Filed: Dec. 2, 2016

(65) Prior Publication Data

US 2017/0160514 A1   Jun. 8, 2017

(30) Foreign Application Priority Data

Dec. 8, 2015 (JP) ................................. 2015-239346
Dec. 8, 2015 (JP) ................................. 2015-239347

(51) Int. Cl.
  *G02B 7/10* (2006.01)
  *G03B 17/56* (2006.01)
  *G02B 7/08* (2006.01)
  *G03B 3/10* (2006.01)

(52) U.S. Cl.
  CPC ............ *G03B 17/56* (2013.01); *G02B 7/08* (2013.01); *G02B 7/102* (2013.01); *G03B 3/10* (2013.01); *G03B 2205/0046* (2013.01); *G03B 2205/0053* (2013.01)

(58) Field of Classification Search
  CPC ... G02B 7/09; G02B 7/10; G02B 7/04; G02B 3/10
  USPC ............................... 359/822–830; 396/72–88
  See application file for complete search history.

(56) References Cited

U.S. PATENT DOCUMENTS

6,014,269 A * 1/2000 Nomura ................. G02B 7/102
                                                    359/700

FOREIGN PATENT DOCUMENTS

| JP | H8-890 U     | 5/1996 |
| JP | H11-014890 A | 1/1999 |
| JP | 2003029124 A | 1/2003 |
| JP | 2007108373 A | 4/2007 |

OTHER PUBLICATIONS

Machine translation of Katagishi, JP 2003-029124, Jan. 2003.*

* cited by examiner

*Primary Examiner* — Kristina M Deherrera
(74) *Attorney, Agent, or Firm* — Rossi, Kimms & McDowell LLP

(57) ABSTRACT

An optical driving apparatus attached to an optical apparatus having a ring member that is rotatable on an outer circumference of a barrel includes a driver configured to rotate the ring member, a detector configured to detect an object that has entered a space between the optical apparatus and the optical driving apparatus, and a controller configured to control the driver in accordance with a detection of the object by the detector when the driver is rotating the ring member. The detector has a contacted portion configured to contact the object, and detects the object when the object is pressed against the contacted portion.

20 Claims, 18 Drawing Sheets

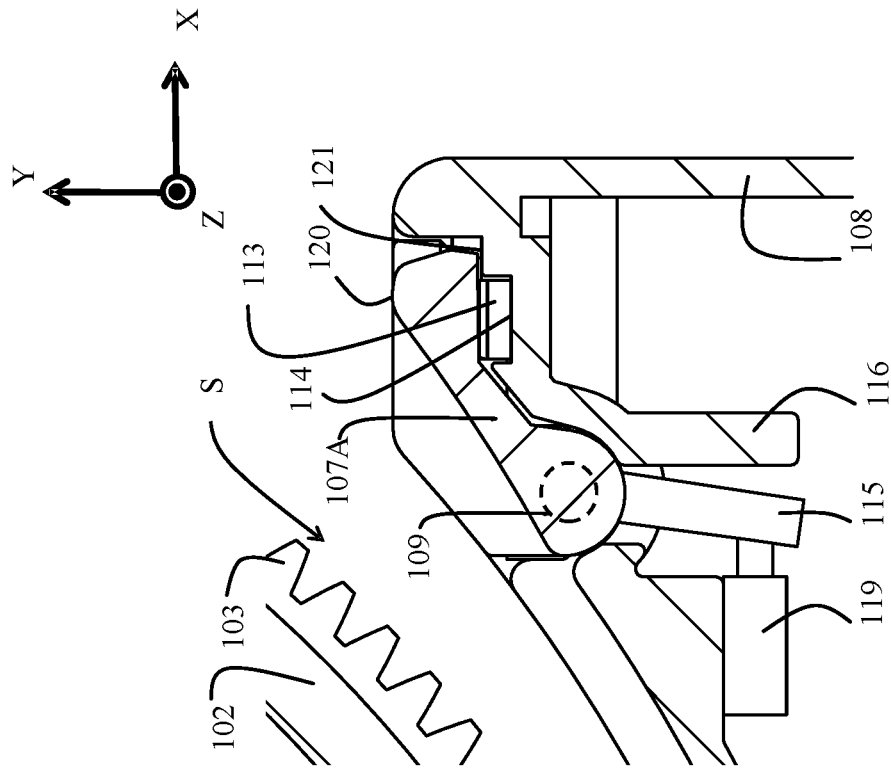
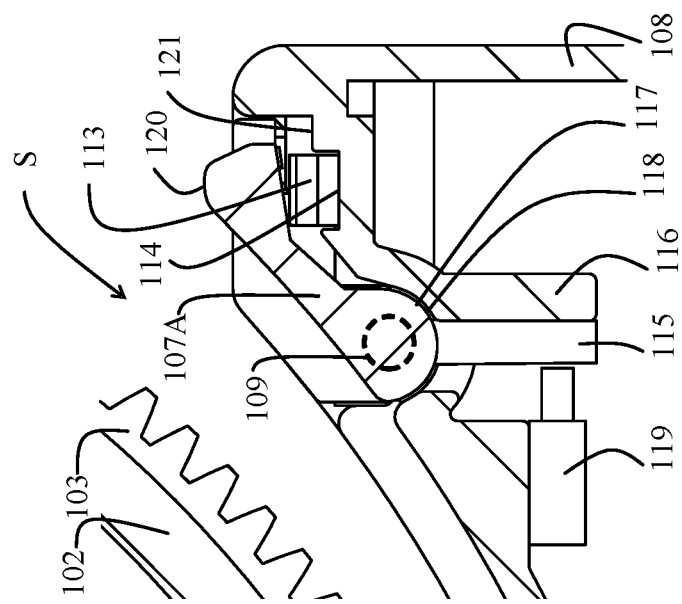
FIG. 11A
FIG. 11B

OPTICAL DRIVING APPARATUS, OPTICAL APPARATUS, AND OPTICAL DRIVING PROGRAM

BACKGROUND OF THE INVENTION

Field of the Invention

The present invention relates to an optical driving apparatus attached externally to the optical apparatus, such as a video camera, a digital camera, and an interchangeable lens.

Description of the Related Art

An interchangeable lens and an image capturing apparatus may include a mechanism that enables a user to manually operate a ring member, such as a manual operation ring provided on a barrel, and to move a lens in the barrel in an optical axis direction for zooming (magnification variations) and focusing. It may be advantageous for such an interchangeable lens and image capturing apparatus that an actuator electrically drives a lens for focusing and zooming, for example, in motion image capturing.

Japanese Patent Laid-Open Nos. 2007-108373 and 11-014890 each disclose an optical driving apparatus, attached externally to a barrel of an interchangeable lens that provides zooming through an manual operation of a zoom ring, and configured to enable the zoom ring to be rotated by an actuator in response to an operation of a zoom switch.

However, the optical driving apparatus attached externally to the barrel and configured to rotate the ring member provided on the barrel, as disclosed in Japanese Patent Laid-Open Nos. 2007-108373 and 11-014890, can have a large space (aperture) into which a finger of the user can be inserted between the body of the optical driving apparatus and the ring member. When the finger enters the space when the ring member is rotated, the finger may be jammed between the ring member and the optical driving apparatus or the finger may be undesirably repelled by the ring member.

SUMMARY OF THE INVENTION

The present invention provides an optical driving apparatus which can prevent an object, such as a finger, from being jammed and repelled, which has been inserted into a space between a ring member on a barrel side and a body on an optical driving apparatus side.

An optical driving apparatus according to one aspect of the present invention attached to an optical apparatus having a ring member that is rotatable on an outer circumference of a barrel includes a driver configured to rotate the ring member, a detector configured to detect an object that has entered a space between the optical apparatus and the optical driving apparatus, and a controller configured to control the driver in accordance with a detection of the object by the detector when the driver is rotating the ring member. The detector has a contacted portion configured to contact the object, and detects the object when the object is pressed against the contacted portion.

Further features of the present invention will become apparent from the following description of exemplary embodiments with reference to the attached drawings.

BRIEF DESCRIPTION OF THE DRAWINGS

FIGS. 11A and 11B are views for explaining a motion of the jam detector according to the third embodiment.

DESCRIPTION OF THE EMBODIMENTS

Referring now to the accompanying drawings, a description will be given of embodiments of the present invention.

First Embodiment

Figure 1:
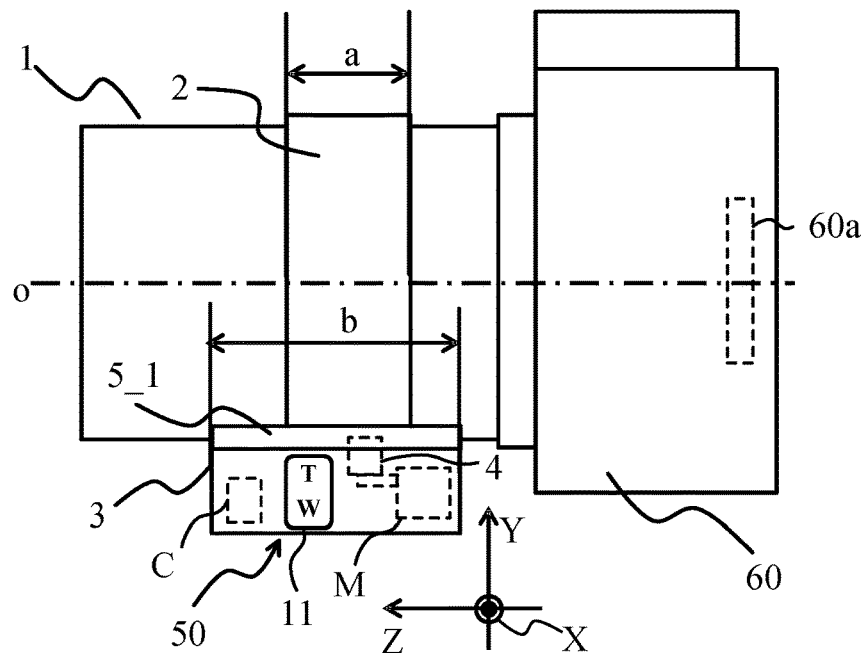
FIG. 1 is a side view of an image capturing apparatus to which a lens drive unit is externally attached according to a first embodiment of the present invention.
Figure 2:
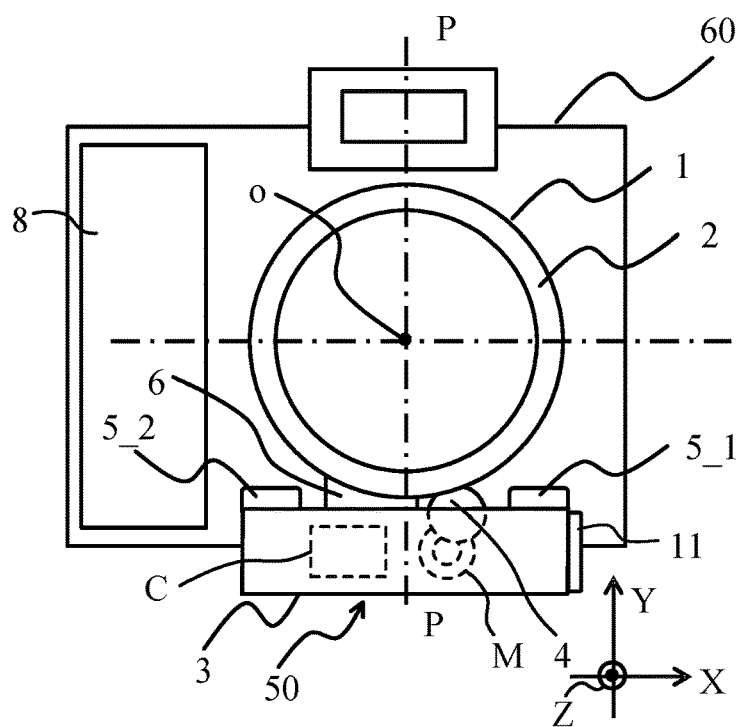
FIG. 2 is a front view of the image capturing apparatus to which a lens drive unit is externally attached according to the first embodiment.

FIGS. 1 and 2 illustrate a lens drive unit (simply referred to as a "drive unit" hereinafter) 50 as an optical driving apparatus according to a first embodiment of the present invention. The drive unit 50 is attached externally to a lens barrel 1 provided to a camera 60 that includes an image sensor 60a. The lens barrel 1 may be integrated with the camera (optical apparatus) 60 or configured as an interchangeable lens (optical apparatus) attachable to and detachable from the camera 60.

In FIGS. 1 and 2, a Z direction is a direction (optical axis direction) in which an optical axis o extends in the lens barrel 1, and an object side in the Z direction is a front side and an image side in the Z direction is a backside. A Y direction is a vertical direction in FIGS. 1 and 2 orthogonal to the Z direction, and an X direction is a lateral direction orthogonal to the Y and Z directions. FIG. 1 illustrates the camera 60 including the lens barrel 1 and the drive unit 50 viewed from the X direction. FIG. 2 illustrates them viewed from the front side.

The lens barrel 1 has a zoom (magnification-varying) function. A zoom ring (ring member) 2 is rotatable around the optical axis and provided on an outer circumference of the lens barrel 1. One or more of lenses in the lens barrel 1 are moved in the Z direction by rotating the zoom ring 2 for zooming. The user can manually rotate the zoom ring 2 (through zooming), and the drive unit 50 can electrically rotate the zoom ring 2.

The drive unit 50 is attached to the lens barrel 1 so that its body (base member) 3 is located under the lens barrel 1 in the Y direction. The body 3 holds a motor M that rotates the zoom ring 2, and a transmission gear 4 that transmits an output of the motor M to the zoom ring 2. The driver includes the motor M and the transmission gear 4. The body 3 includes an attachment unit 6 used to attach the body 3 to the lens barrel 1. The body 3 attached to the lens barrel 1 (or the drive unit 50) is disposed so as to form a space (aperture) between the body 3 and the zoom ring 2. The transmission gear 4 is engaged with an unillustrated gear provided on the outer circumference of the zoom ring 2.

While this embodiment attaches the body 3 of the drive unit 50 to the lens barrel 1, the body 3 may be attached to the camera 60 so that the body 3 may be located under the lens barrel 1.

The body 3 includes an unillustrated drive on/off switch so as to switch manual driving (manual zooming) and electric driving (electric zooming) in the zoom ring 2, and a zoom switch 11 for electric zooming on a side surface of the body 3 in the X direction. The zoom switch 11 is a slide switch that is slidable in the Y direction or a seesaw switch (locker switch) that is movable up and down on the XY plane. When the zoom switch 11 is operated to select the upper telephoto (T) side in the Y direction, the controller C drives the motor M in a rotating direction for zooming to the telephoto side. Of course, the zoom switch 11 may be a slide switch that is slidable in the Z direction or a seesaw switch that is movable up and down on the XZ plane.

When the zoom switch 11 is operated to select the lower wide-angle (W) side, the controller C drives the motor M in a rotating direction for zooming to the wide-angle side. The output of the motor M is transmitted to the zoom ring 2 via the transmission gear 4 for electric zooming to the telephoto side or the wide-angle side when the zoom ring 2 is rotated.

Provided on left and right sides on the top surface of the body 3 on the zoom ring 2 side are touch panels 5_1 and 5_2 which an object, such as a finger of a user, can contact, when the object enters the space (first space and second space) between the body 3 and two mutually different circumferential portions in the zoom ring 2. The touch panels 5_1 and 5_2 are detectors (first detector and second detector) configured to detect the object inserted into the respective spaces. The touch panels 5_1 and 5_2 serve as pressure sensors or piezoelectric films (pressure detectors) and detect compressed contacts or pressing forces of the object against contacted portions on their surfaces, and output detection signals corresponding to the pressing forces.

The touch panels 5_1 and 5_2 extend by a length "b" in the Z direction (or first direction corresponding to the optical axis direction). The length b is longer than the length a in the zoom ring 2 in the Z direction. The touch panels 5_1 and 5_2 are arranged along the overall range of the width "a" in the zoom ring 2.

The controller C controls the motor M in accordance with a detection signal from at least one of the touch panels 5_1 and 5_2. This embodiment describes that the object is the finger of the user, but the object may be a finger of a non-user or a non-finger, such as a rod.

Figure 3:
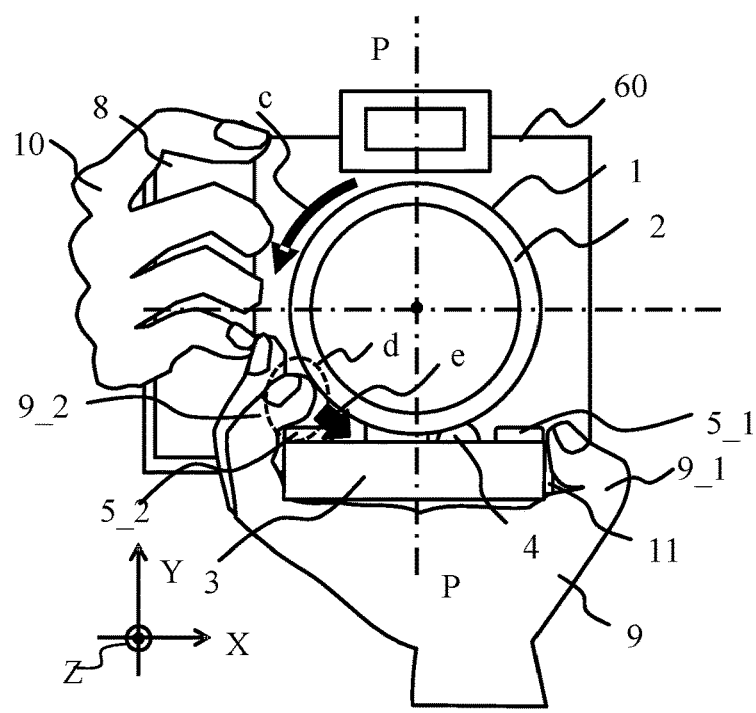
FIG. 3 is a view for explaining a detection of a jammed finger according to the first embodiment.
Figure 4:
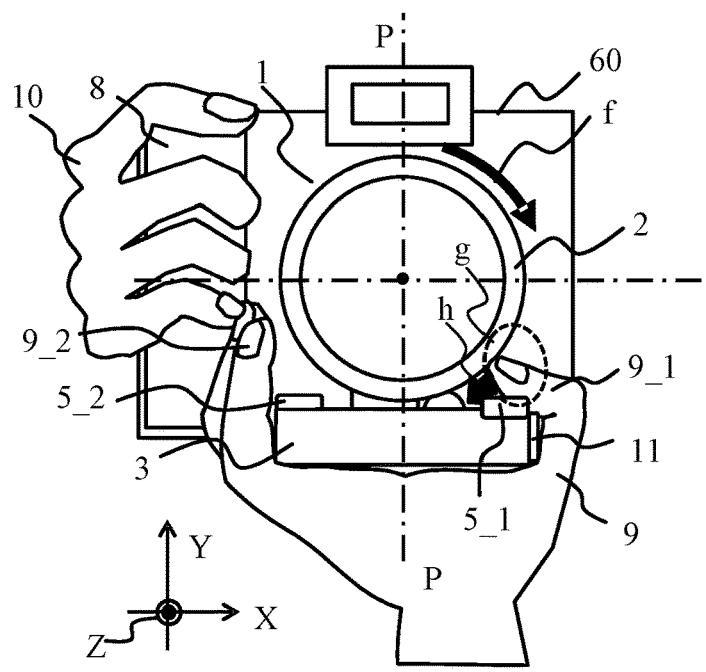
FIG. 4 is another view for explaining the detection of a jammed finger according to the first embodiment.

Referring now to FIGS. 3 and 4, a description will be given of a finger jam preventive function between the zoom ring 2 and the drive unit 50 (body 3). FIGS. 3 and 4 illustrate that both hands of the user holding the camera 60 for image capturing support (grasp) both the camera 60 and the drive unit 50. FIG. 3 illustrates that the zoom ring 2 rotates in a first rotating direction "c" (counterclockwise viewed from the front). FIG. 4 illustrates that the zoom ring 2 rotates in a second rotating direction "f" (clockwise viewed from the front).

In either case, the user holds a grip 8 of the camera 60 with his right hand 10, and the drive unit 3 with his left hand 9 from the bottom. The user can operate the drive on/off switch provided to the drive unit 3, and select the manual zoom or electric zoom. The finger of the user can touch both the zoom ring 2 and the drive unit 3 anytime. When the zoom ring 2 is rotated by electric zooming, the finger of the user may be inserted into the space between the zoom ring 2 and the body 3 of the drive unit 50.

For example, as illustrated in FIG. 3, when the user operates the zoom switch 11 with a thumb 9_1, he does not care about a position of another finger (forefinger herein) 9_2, and the forefinger 9_2 may undesirably touch the rotating zoom ring 2. When the forefinger 9_2 entering a first space "d" between the zoom ring 2 and the body 3 touches the zoom ring 2, the forefinger 9_2 is pressed against the body 3 by the rotating zoom ring 2 in the e direction. As a result, the forefinger 9_2 is jammed between the zoom ring 2 and the body 3.

In addition, as illustrated in FIG. 4, when the front surface of the thumb 9_1 operates the zoom switch 11 on the T side or when the drive unit 50 is stably held by the hand, the tip of the thumb 9_1 may touch the rotating zoom ring 2. When the tip of the thumb 9_1 inserted into the second space "g" between the zoom ring 2 and the body 3 touches the zoom ring 2, when the zoom ring 2 is rotated in the second rotating direction "f," the thumb 9_1 is pressed against the body 3 by the rotating zoom ring 2. As a result, the thumb 9_1 is jammed between the zoom ring 2 and the body 3.

In order to prevent the finger from being jammed between the rotating zoom ring 2 and the body 3, this embodiment detects that the finger of the user that contacts the rotating zoom ring 2 is pressed against the touch panels 5_1 and 5_2.

Each of the touch panels 5_1 and 5_2 outputs the detection signal to the controller C according to the pressing force always applied to its surface while the zoom ring 2 is electrically being driven. When the finger contacts the zoom ring 2 and is pressed against at least one of the touch panels 5_1 and 5_2, the pressing force indicative of the detection signal increases. The controller C provides a control (jam preventive control) so as to stop driving the motor M or reversely rotate the motor M, when the pressing force is equal to or larger than a predetermined value, because the finger is likely to be jammed between the zoom ring 2 and the body 3. This configuration can prevent the finger from being jammed between the zoom ring 2 and the body 3. The control to stop driving the motor M may send a command to stop rotating to the motor M or may not send any commands to the motor M at all.

Moreover, as illustrated in FIGS. 3 and 4, areas (spaces "d" and "g") that may jam the finger are different in accordance with the rotating directions "c" and "f" of the zoom ring 2. Thus, this embodiment provides the touch panels 5_1 and 5_2 on both left and right sides with respect to a line P-P as a center which passes the optical axis o and the center of the drive unit 50 in the X direction and divides the two areas. Thereby, the finger is prevented from being jammed even when the zoom ring 2 is electrically driven in either direction.

This embodiment describes the jam preventive control when the pressing force applied by a finger to the touch panel is equal to or larger than the predetermined value. However, the jam preventive control may be performed when the pressure applied by the finger is equal to or larger than a predetermined value. In this case, the touch panel uses a press sensor (pressure detector).

Second Embodiment

Figure 5:
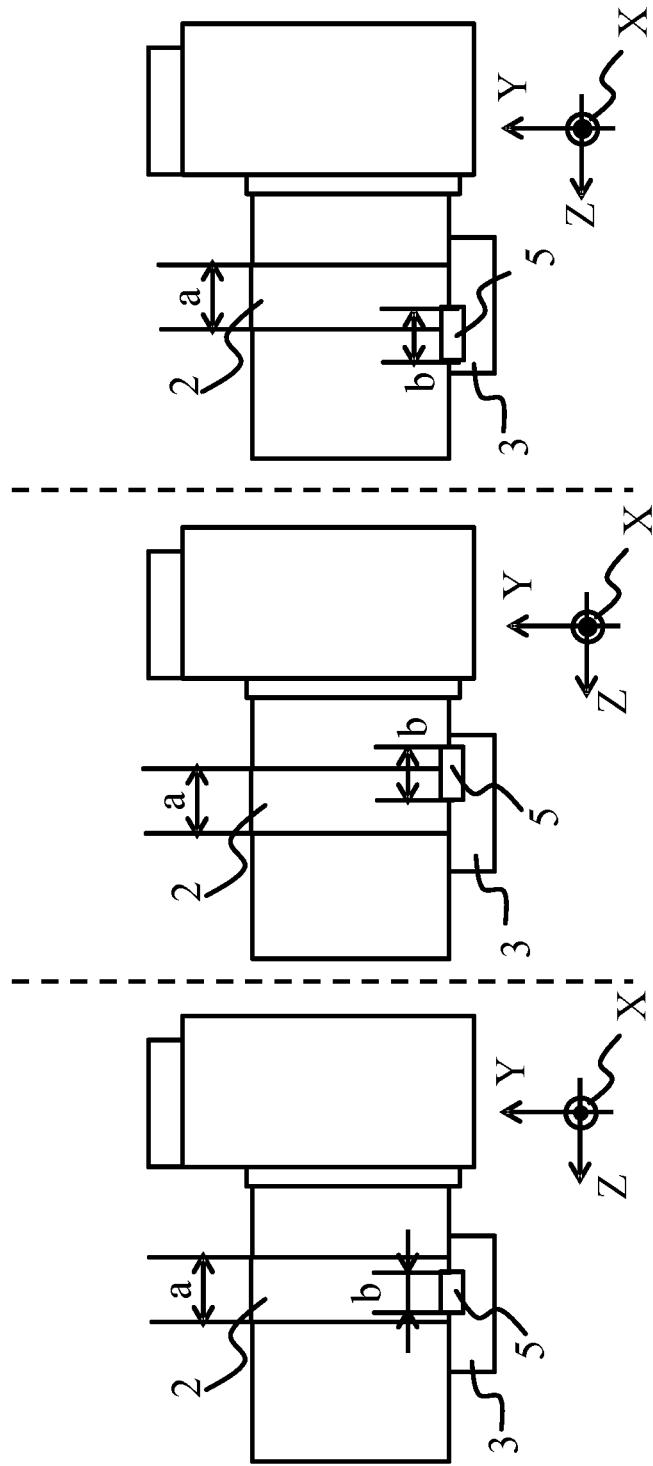
FIGS. 5A to 5C are views for explaining an arrangement of a touch panel and a zoom ring according to a second embodiment of the present invention.

Referring now to FIG. 5, a description will be given of a second embodiment of the present invention. This embodiment describes another arrangement of the touch panel different from in the first embodiment. This embodiment is similar to the first embodiment except for the arrangement of the touch panel.

Due to the design restrictions etc., the touch panel may not be wider than the zoom ring unlike the first embodiment. In this case, as illustrated in FIGS. 5A, 5B, and 5C, the touch panel 5 may be narrower than the width "a" of the zoom ring 2. In FIG. 5A, the touch panel 5 is disposed at the center of the zoom ring 2 in the width direction. In FIG. 5B, the touch panel 5 is disposed at the back of the zoom ring 2 in the width direction. In FIG. 5C, the touch panel 5 projects ahead of the zoom ring 2 in the width direction. Of course, the width "a" of the zoom ring 2 may be equal to the width of the contacted portion.

While each of the above embodiments describes that the ring member provided onto the barrel is the zoom ring for zooming, the ring member may be a focus ring for focusing, an iris ring for aperture stop operation, and a ring member other than the zoom ring.

While each embodiment uses the pressure sensor for the detector configured to detect a pressure by an object, another detector may be used as long as the pressing force is detectable.

While each embodiment of the present invention describes the body 3 of the drive unit 50 disposed under the lens barrel 1, the body 3 may be disposed at an arbitrary position in a circumferential direction of the lens barrel.

Third Embodiment

Figure 6:
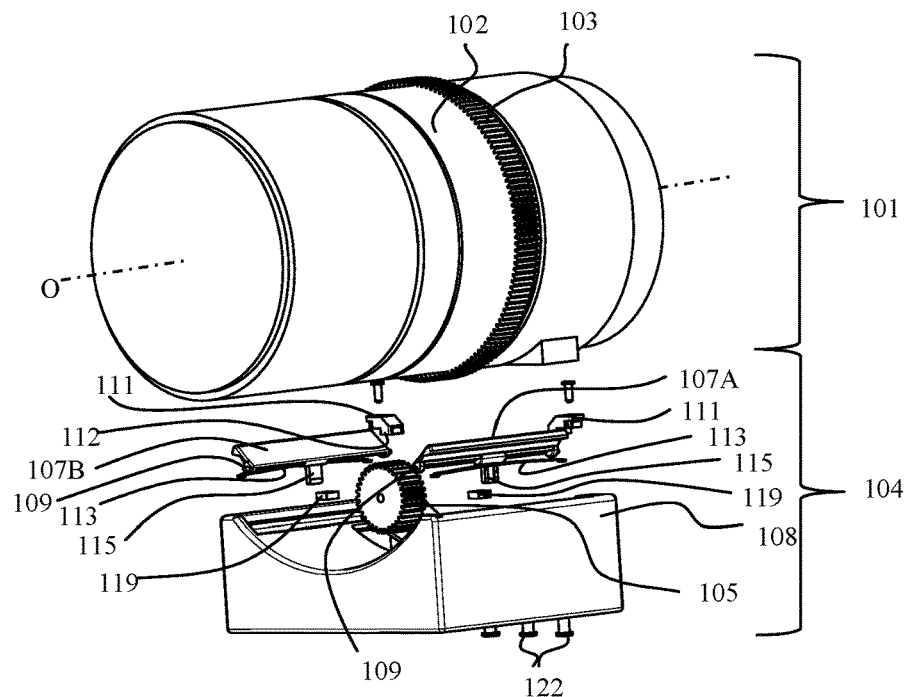
FIG. 6 is an exploded perspective view of a lens drive unit according to a third embodiment of the present invention.
Figure 7:
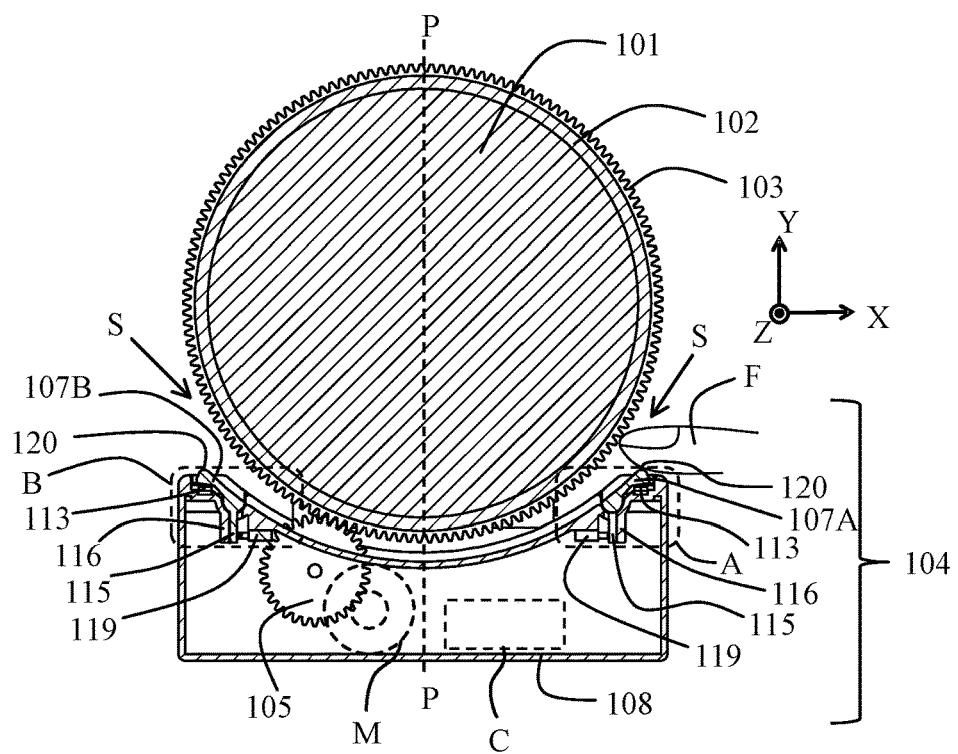
FIG. 7 is a front sectional view of the lens drive unit according to the third embodiment.
Figure 8:
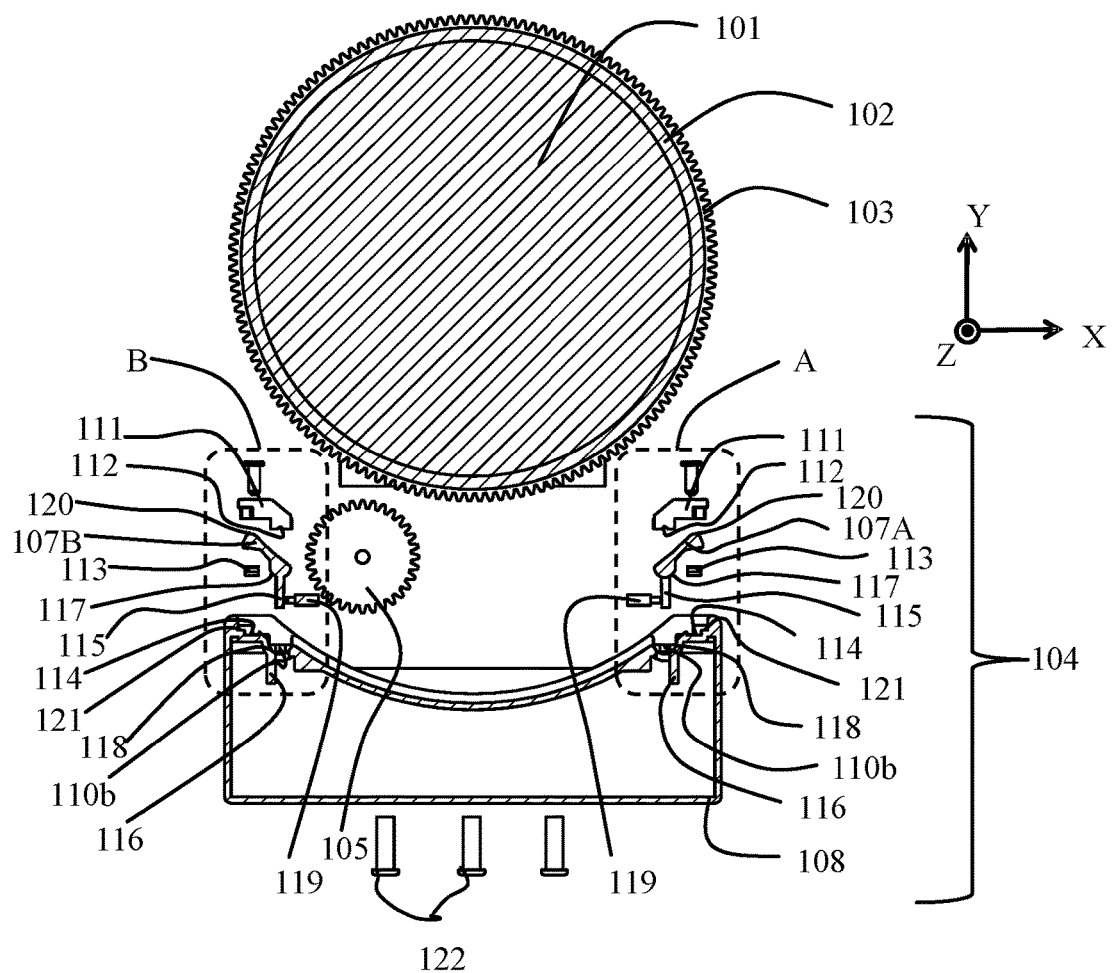
FIG. 8 is an exploded sectional view of the lens drive unit according to the third embodiment.

FIGS. 6, 7, and 8 illustrate a (lens) drive unit 104 as an optical driving apparatus according to a third embodiment of the present invention. The drive unit 104 is attached externally to a lens barrel 101 provided to an unillustrated camera. The lens barrel 101 may be integrated with the camera, and may be provided as an interchangeable lens that is attached to and detached from the camera. In FIGS. 6 to 8, a Z direction is a direction (optical axis direction) in which an optical axis o extends in the lens barrel 101, and an object side in the Z direction is a front side and an image side in the Z direction is a backside. A Y direction is a vertical direction in FIGS. 7 and 8 orthogonal to the Z direction, and an X direction is a lateral direction orthogonal to the Y and Z directions.

FIG. 6 illustrates an exploded drive unit 104 before it is attached to the lens barrel 101. FIG. 8 illustrates a section viewed from the front side of the drive unit 104 before it is attached to the lens barrel 101. FIG. 7 illustrates a section viewed from the front side of the drive unit 104 after it is attached to the lens barrel 101.

The lens barrel 101 has a zoom (magnification-varying) function. A zoom ring (ring member) 102 is rotatable around an optical axis and provided on an outer circumference of the lens barrel 101. One or more of lenses in the lens barrel 101 are moved in the Z direction by rotating the zoom ring 102 for zooming. The user can manually rotate the zoom ring 102 (through zooming), and the drive unit 104 can electrically rotate the zoom ring 102.

The drive unit 104 is attached to the lens barrel 101 via three screws 122 as attachment units illustrated in FIGS. 6 and 8 so that its body (base member) 108 is located under the lens barrel 101 in the Y direction. The body 108 holds a motor M that rotates the zoom ring 102, as illustrated in FIG. 7, and a transmission gear 105 that transmits an output of the motor M to the zoom ring 102. The driver includes the motor M and the transmission gear 105.

The body 108 of the drive unit 104 attached to the lens barrel 101 is arranged so as to form a space (aperture) between the body 108 and the zoom ring 102. The transmission gear 105 is engaged with a gear 103 provided on the outer circumference of the zoom ring 102.

While this embodiment attaches the body 108 of the drive unit 104 to the lens barrel 101, the body 108 may be attached to the camera so that the body 108 may be located under the lens barrel 101.

The body 108 includes an unillustrated drive on/off switch so as to switch manual driving (manual zooming) and electric driving (electric zooming) in the zoom ring 102, and an unillustrated zoom switch for electric zooming. When the zoom switch is operated to the telephoto side, the controller C drives the motor M in the rotating direction for zooming to the telephoto side.

When the zoom switch is operated to the wide-angle side, the controller C drives the motor M in a rotating direction for zooming to the wide-angle side. The output of the motor M is transmitted to the zoom ring 102 via the transmission gear 105 for electric zooming to the telephoto side or the wide-angle side when the zoom ring 102 is rotated.

Parts A and B enclosed by broken lines in FIG. 7 are finger detectors configured to detect an object (finger hereinafter) F of a user inserted into a space (first and second spaces) S between the body 108 and mutually different circumferential portions in the zoom ring 102. The finger detectors (first detector and the second detector) A and B are provided at both sides in the X direction with respect to the line P-P that is made by connecting the center of the drive unit 104 in the X direction to the center of the lens barrel 101 (optical axis) as illustrated.

Each of the finger detectors A and B includes a detecting member 107 (107A, 107B) as a contacted portion configured to contact the finger F and provided on a corresponding one of the left and right sides on the top surface of the body 108 on the zoom ring 102 side, and a switch element 119 as a contact switch. The detecting member 107 extends in the Z direction (or the first direction corresponding to the optical axis direction) and is longer than the zoom ring 102 in the Z direction. At the top of the detecting member 107, a vertex (convex) 120 is formed facing the zoom ring 102 (lens barrel 101).

When the finger F is pressed against the vertex 120 of the detecting member 107 and the detecting member 107 is moved (or rotated as described later), the switch element turns on and detection signal is output from the switch element 119.

This embodiment discusses that the object is the finger of the user, but the object may be a finger of a non-user or a non-finger, such as a rod.

Figure 9:
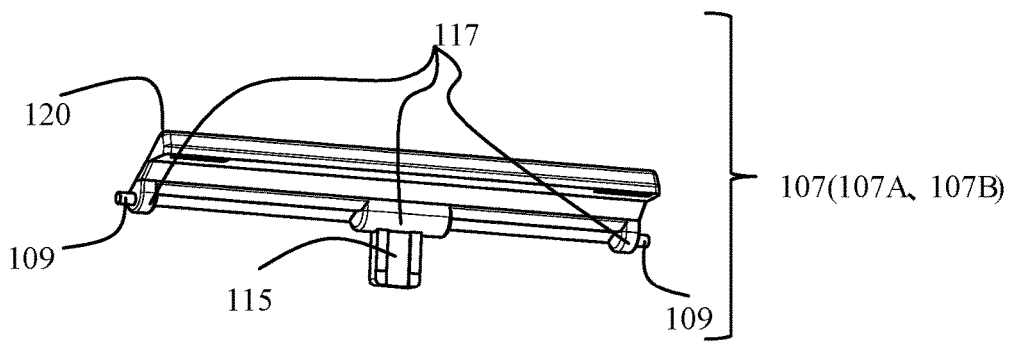
FIG. 9 is a perspective view of a jam detector according to the third embodiment.
Figures 10A, 10B:
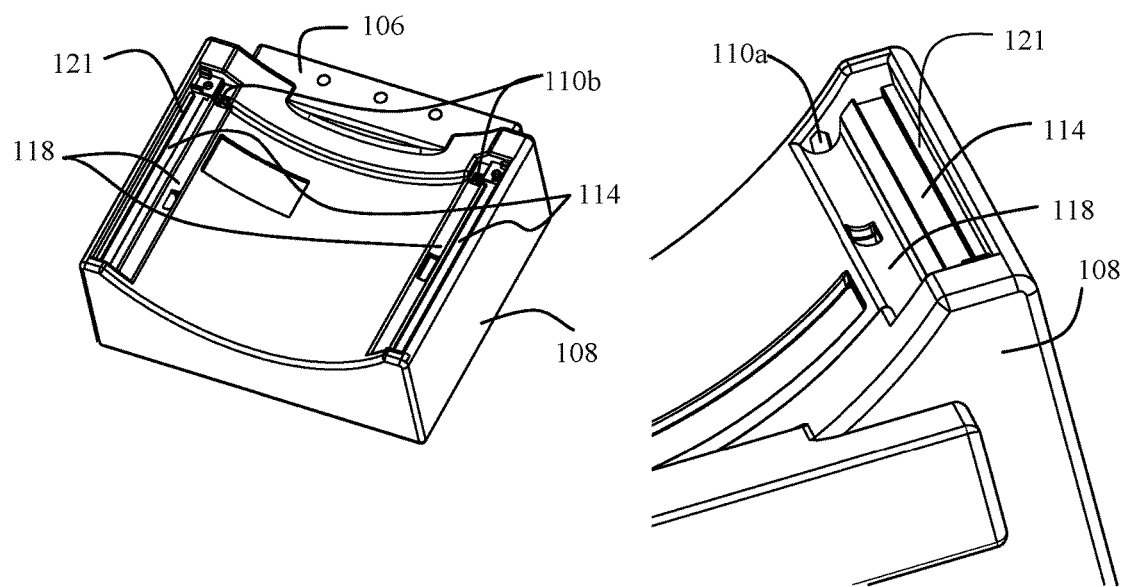
FIGS. 10A and 10B are perspective views of a base member according to the third embodiment.

A description will be given of a detailed configuration and operation of the finger detectors A and B. FIG. 9 illustrates an enlarged detecting member 107 (where the detecting members 107A and 107B are the same members). FIG. 10A illustrates the body 108 before the detecting member 107 is attached, and FIG. 10B illustrates part of the body 108 perspectively viewed from the backside.

Reference numeral 109 denotes an axial portion formed at both ends of the detecting member 107 in the longitudinal direction. Reference numeral 110a denotes a shaft engagement hole portion (boss engagement hole portion) formed in the body 108. Reference numeral 110b denotes an axial support groove portion formed in the body 108. Reference numeral 111 denotes a retaining member. Reference numeral 112 denotes an axial retaining portion formed on the retaining member. The detecting member 107 is held rotatably around the axial portion 109 by the body 108, because one or the other of the axial portions 109 are inserted into the boss engagement hole portion 110a and the axial support groove portion 110b, and the retaining member 111 are screwed onto the body 108 so as to cover the axial support groove portion 110b. The top surface of the boss engagement hole portion 110a and the axial retaining portion 112 in the retaining member 111 have a V-groove shape.

As a result, the movement (looseness) of the axial portion 109 in the detecting member 107 in the X direction can be restrained. Reference numeral 117 denotes a semicylindric convex surface formed at the center part and both sides of the detecting member 107 in the longitudinal direction, and the detecting member 107 rotates so that the semicylindric convex surface 117 slides relative to a semicylindric concave surface 118 formed in the body 108.

Reference numeral 113 denotes a flat spring as an elastic member, disposed in a spring holding groove portion 114 formed in the body 108, and configured to force the detecting member 107 upwardly in the Y direction or towards the initial rotating position, which will be described later, of the detecting member 107. The elastic member may use a non-flat spring, such as a coil spring and rubber. Reference numeral 115 denotes a switch presser downwardly extending from the center of the detecting member 107 in the longitudinal direction.

The switch element 119 is electrically connected to the controller C via an unillustrated flexible substrate. The switch element 119 is fixed into the body 108 using a double-sided tape, etc. The switch element 119 turns on and outputs a detection signal when the switch presser 115 of the detecting member 107 that has rotated from the initial rotating position is pressed.

Reference numeral 116 denotes a stopper formed on the body 108. When the switch presser 115 of the detecting member 107 forced by the flat spring 113 contacts the stopper 116, the detecting member 107 is prevented from rotating beyond the initial rotating position.

A description will now be given of the operation of the finger detector A. The operation of the finger detector B is basically the same as that of the finger detector A, but the rotating direction of the detecting member 107B is reverse to the rotating direction of the detecting member 107A. The clockwise and counterclockwise directions are rotating directions viewed from the front side.

FIG. 11A illustrates a section viewed from the front side of the finger detector A when the finger is not pressed against the detecting member 107A. An outer side is a side (opening side of the space S) of the body 108 close to the right side surface in the X direction (second direction orthogonal to the first direction), and an inner side is a side (depth side of the space S) of the body 108 farther from the right side surface.

The axial portion 109 is provide onto the inner portion of the detecting member 107A, and the flat spring 113 is disposed so as to upwardly force the outer portion of the detecting member 107A from the axial portion 109. Thereby, the detecting member 107A is forced counterclockwise around the axial portion 109, and the switch presser 115 contacts the stopper 116, and the detecting member 107A is held at the initial rotating position.

As illustrated in FIG. 7, when the finger F downwardly presses the vertex 120 of the detecting member 107A, the detecting member 107A rotates clockwise around the axial portion 109, because the axial portion 109 is provided onto the inner portion of the detecting member 107A (inside of the vertex 120) viewed from the front side. At this time, the axial portion 109 is actually slightly separated downwardly from the V-shaped top surface of the boss engagement hole portion 110a and the V-shaped axial retaining portion 112 of the retaining member 111, and the semicylindric convex surface 117 contacts the semicylindric concave surface 118. Therefore, the detecting member 107A rotates while the semicylindric convex surface 117 slides relative to the semicylindric concave surface 118.

FIG. 11B illustrates a section viewed from the front side when the vertex 120 of the detecting member 107A is pressed by the finger F, as illustrated in FIG. 7. The detecting member 107A is pressed by a pressing force with a magnitude beyond the force of the flat spring 113 (or a magnitude that exceeds the predetermined value), and rotates clockwise from the initial rotating position around the axial portions 109 or the outer portion rotates so as to separate from the zoom ring 102. The switch presser 115 provided on the detecting member 107A presses the switch element 119 and turns it on, and the detection signal is output from the switch element 119.

Reference numeral 121 denotes a stopper formed on the body 108. When the detecting member 107A that has rotated clockwise contacts the stopper 121, the further rotation of the detecting member 107A is prevented from rotating beyond the maximum rotating position as the rotating position at that time. This configuration can prevent the switch element 119 from being excessively pressed and getting damaged by the switch presser 115.

This embodiment uses the flat spring 113 as the elastic member as described above. When the detecting member 107A rotates from the initial rotating position and reaches the maximum rotating position, a deformation amount of the flat spring 113 in the Y direction becomes maximum and its length in the Z direction becomes maximum. Thus, this embodiment makes the spring holding groove portion 114 in the Z direction longer than the maximum deformation amount of the flat spring 113 in the Z direction.

Thereby, when the detecting member 107A rotates from the initial rotating position, both sides of the flat spring 113 in the Z direction contact both ends of the spring holding groove portion 114 in the Z direction, preventing the detecting member 107A from failing to rotate up to the maximum rotating position and the flat spring 113 from being plastically deformed.

Referring now to FIG. 7, a description will be given of an easy detection of the finger F that has entered the space S between the body 108 in the drive unit 104 in this embodiment and the zoom ring 102 using the finger detector A as an example. When the finger F does not enter the space S or the finger F that has entered the space S does not press the detecting member 107A as illustrated in FIG. 7, the detecting member 107A is forced counterclockwise and held at the initial rotating position. In this state, an interval is narrow between the vertex 120 of the detecting member 107A and the zoom ring 102. Hence, the finger F that has entered the space S (or the finger F contacting the clockwise rotated zoom ring 102 and pressed downwardly) can easily squeeze the detecting member 107A clockwise.

Thus, the switch element 119 is likely to turn on and the detection signal from the switch element 119 is likely to be input into the controller C. Similar to the first embodiment, the controller C that has received the detection signal performs a (jam preventive) control so as to stop driving the motor M or to reversely rotate the driving direction. This configuration can prevent the finger from being jammed between the zoom ring 102 and the body 108.

When the detecting member 107A rotates clockwise, the vertex 120 retreats and separates from the zoom ring 102. This configuration can prevent the finger F from being jammed between the detecting member 107A and the zoom ring 102.

Figure 12:
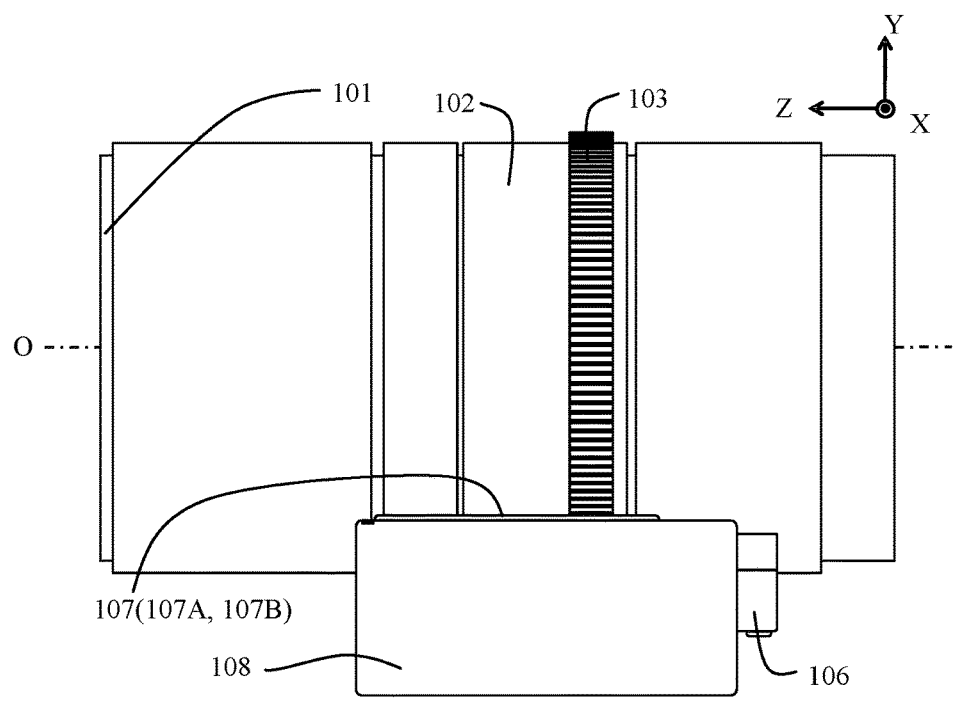
FIG. 12 is a side view of the lens drive unit according to the third embodiment.

FIG. 12 illustrates the lens barrel 101 viewed from the X direction, to which the drive unit 104 according to this embodiment is attached. The detecting member 107 (107A, 107B) in the Z direction is longer than the zoom ring 102 in the Z direction. Therefore, the detecting member 107 is disposed along the overall length range of the zoom ring 102. This configuration can detect an entry of a finger into the space between the zoom ring 102 and the body 108 at an arbitrary position in the Z direction.

If the detecting member 107 cannot be made longer than the zoom ring 102 due to the design restrictions, etc., the detecting member 107 may be shorter than the zoom ring 102, as described in the second embodiment (with reference to FIGS. 5A, 5B, and 5C).

This embodiment can easily detect the finger that has entered the space between the zoom ring 102 and the drive unit 104 (body 108), and provide a jam preventive control, preventing the finger from being jammed between the zoom ring 102 and the body 108.

Fourth Embodiment

Figure 13:
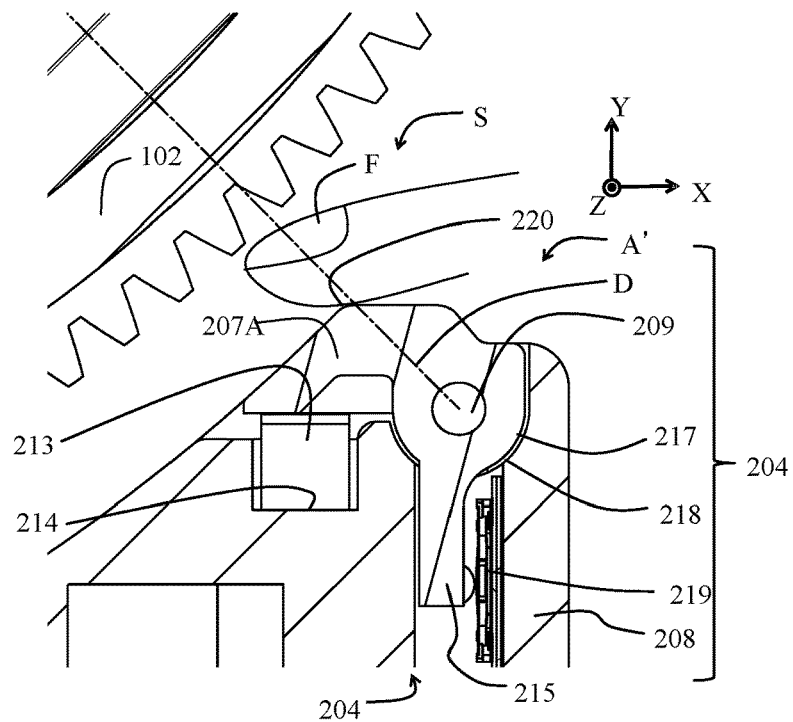
FIG. 13 is an enlarged sectional view of a lens drive unit according to a fourth embodiment of the present invention.

Referring now to FIG. 13, a description will be given of a drive unit 204 according to a fourth embodiment of the present invention. This embodiment is a variation of the third embodiment. FIG. 13 illustrates an enlarged finger detector A' viewed from the front side among two finger detectors provided at both sides of the drive unit 204 according to this embodiment in the X direction instead of the finger detector A according to the third embodiment. The Z, Y, and X directions are defined similarly to the third embodiment.

The finger detector A' includes a detecting member 207A as a contacted portion provided on the top surface of the body 208 in the drive unit 204 on the zoom ring 102 side, and a switch element 219 as a pressure sensor. The detecting member 207A in the Z direction (first direction corresponding to the optical axis direction) is longer than the zoom ring 102 in the Z direction. Similar to the third embodiment, the detecting member 207A is rotatably held by the body 208 via axial portions 209 provided at both sides of the detecting member 207A in its longitudinal direction.

Similar to the third embodiment, a vertex (convex) 220 is formed at the top of the detecting member 207A opposite to the zoom ring 102. However, each axial portion 209 is provided on the outer portion rather than the inner portion to which the vertex 220 is provided in the detecting member 207A. Hence, the detecting member 207A rotates counterclockwise around the axial portions 209.

Reference numeral 217 denotes a semicylindric convex surface formed at the center part and both sides of the detecting member 207A in the longitudinal direction, and the detecting member 207A rotates so that the semicylindric convex surface 217 slides relative to a semicylindric concave surface 218 formed in the body 208.

Reference numeral 213 denotes a flat spring as an elastic member, disposed in a spring holding groove portion 214 formed in the body 208, and configured to upwardly force the inner portion of the detecting member 207A in the Y direction or towards the initial rotating position of the detecting member 207A. The flat spring 213 upwardly forces the inner portion inside the axial portions 209 in the detecting member 207A. Thereby, the detecting member 207A is forced clockwise around the axial portions 209. Even in this embodiment, the elastic member may use a non-flat spring, such as a coil spring and rubber. Reference numeral 215 denotes a switch presser downwardly extending from the center of the detecting member 207A in the longitudinal direction.

FIG. 13 illustrates that the finger F has entered the space between the zoom ring 102 and the body 208. The finger F presses the vertex 220 of the detecting member 207A with a pressing force having a magnitude beyond the force of the flat spring 213 (or a magnitude that exceeds the predetermined value), and the detecting member 207A rotates clockwise from the initial rotating position around the axial portions 209.

The switch presser 215 provided on the detecting member 207A presses the switch element 219, and the detection signal is output from the switch element 219. Even in this embodiment, the unillustrated controller C that has received the detection signal performs a jam preventive control for the unillustrated motor M in the drive unit 204, similar to the third embodiment. This configuration can prevent finger from being jammed between the zoom ring 102 and the body 208.

The detecting member 207A in which the vertex 220 is pressed by the finger F rotates from the initial rotating position counterclockwise around the axial portions 209 outside the vertex 220. Herein, the vertex 220 of the detecting member 207A located at the initial rotating position is located inside a line D that is made by connecting the center of the zoom ring 102 to the center of the axis portion 209 (actually semicylindric convex surface 217). The vertex 220 becomes closest to the zoom ring 102, when the vertex 220 is located on the line D.

In this embodiment in which the vertex 220 is located inside of the line D, the distance between the vertex 220 and the zoom ring 102 is maintained while the vertex 220 is pressed by the finger F and the detecting member 207A rotates counterclockwise from the initial rotating position. In other words, the inner portion having the vertex 220 in the detecting member 207A rotates so as to separate from the zoom ring 102. Hence, although the vertex 220 is located inside of the axial portion 209 in this embodiment, the finger F is hardly inserted into the space between the detecting member 207A and the zoom ring 102.

The operation of the finger detector (B' although it is unillustrated) instead of the finger detector B according to the third embodiment is basically similar to that of the finger detector A', although the rotating direction of the detecting member is reverse to that of the detecting member 207A in the finger detector A'.

Fifth Embodiment

Figure 14:
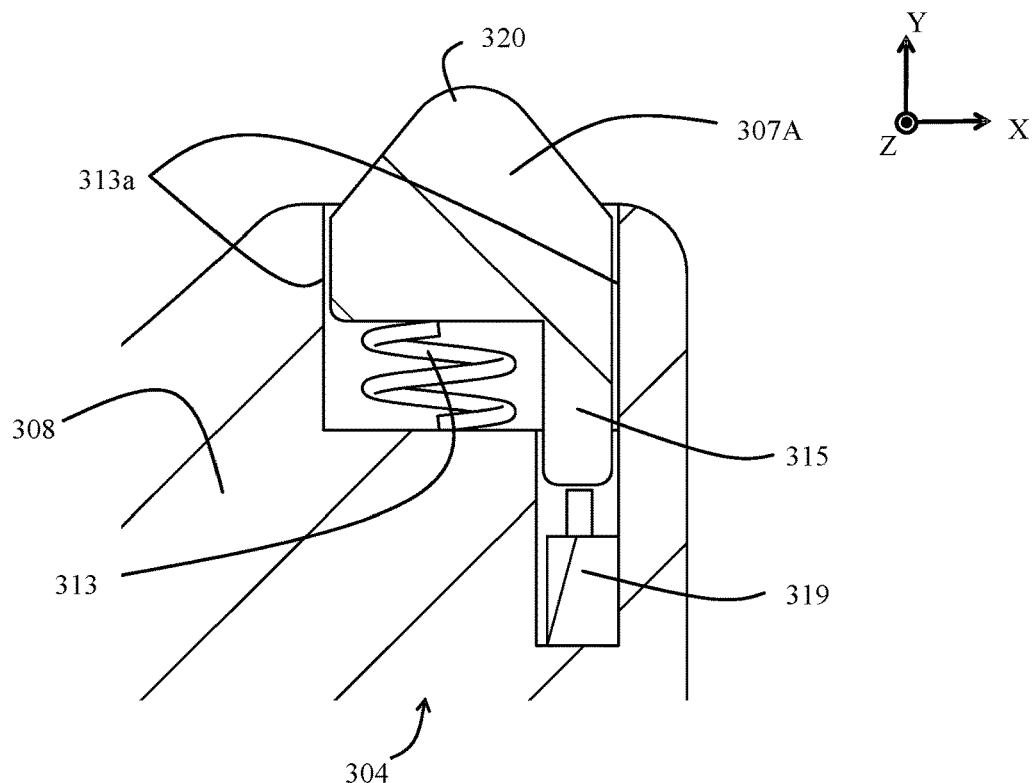
FIG. 14 is an enlarged sectional view of a lens drive unit according to a fifth embodiment of the present invention.
Figure 15:
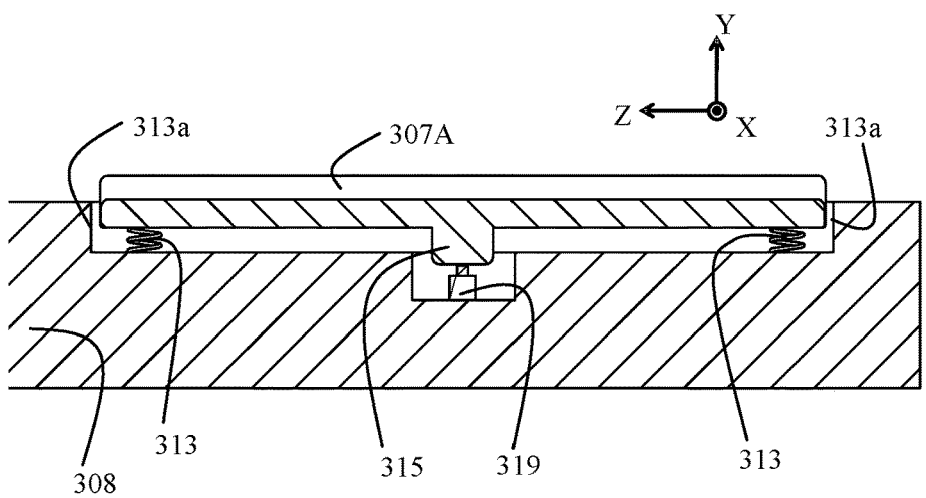
FIG. 15 is a sectional view of the lens drive unit according to the fifth embodiment.

Referring now to FIGS. 14 and 15, a description will be given of a drive unit 304 according to a fifth embodiment of the present invention. This embodiment is a variation of the third embodiment. FIG. 14 illustrates a section of a finger detector A" viewed from the front side instead of the finger detector A according to the third embodiment among the two finger detectors provided on both sides of the drive unit 304 in the X direction according to this embodiment. FIG. 15 illustrates a section of the finger detector A" viewed from the X direction. The Z direction, the Y direction, and the X direction are the same as those illustrated in the third embodiment.

The finger detector A" includes a detecting member 307A as a contacted portion provided on the top surface of a body 308 in the drive unit 304 on the zoom ring 102 side, and a switch element 319 as a contact switch. The detecting member 307A is disposed in a holding groove portion 313a formed in the body 308, extends in the Z direction (or the first direction corresponding to the optical axis direction), and is longer than the zoom ring 102 in the Z direction. The detecting member 307A can linearly move in the Y direction relative to the body 308. A vertex (convex) 320 is formed at the top of the detecting member 307A opposite to the zoom ring 102.

Reference numeral 313 denotes a coil spring as an elastic member configured to upwardly force the detecting member 307A in the holding groove portion 313a in the Y direction or towards the initial position. This embodiment provides two coil springs 313 near both ends of the detecting member 307A in the longitudinal direction. The elastic member may be a non-coil spring, such as a flat spring and rubber. Reference numeral 315 is a switch presser downwardly extending from the center of the detecting member 307A in the longitudinal direction.

When the finger presses the vertex 320 of the detecting member 307A with a pressing force having a magnitude beyond the force of the flat spring 313 (or a magnitude that exceeds the predetermined value), and the detecting member 307A linearly moves down in the Y direction from the initial rotating position relative to the body 308. The switch presser 315 provided on the detecting member 307A presses the switch element 319, and the detection signal is output from the switch element 319. Even in this embodiment, the unillustrated controller C that has received the detection signal performs a jam preventive control for the unillustrated motor M in the drive unit 304 similar to the third embodiment. This configuration can prevent finger from being jammed between the zoom ring 102 and the body 308.

This embodiment arranges the switch presser 315 and switch element 319 at the center of the detecting member 307A in the longitudinal direction. Thereby, even when the finger is pressed at an arbitrary position of the detecting member 307A in the longitudinal direction, the switch presser 315 turns on the switch element 319 and prevents the finger from being jammed.

Each of the above embodiments can control (e.g., stop) rotating the ring member by detecting the object, such as a finger inserted into the space between the optical apparatus and the optical driving apparatus and pressing the contacted portion, and can prevent the object from being jammed between the ring member and the apparatus.

Sixth Embodiment

Figure 16A:
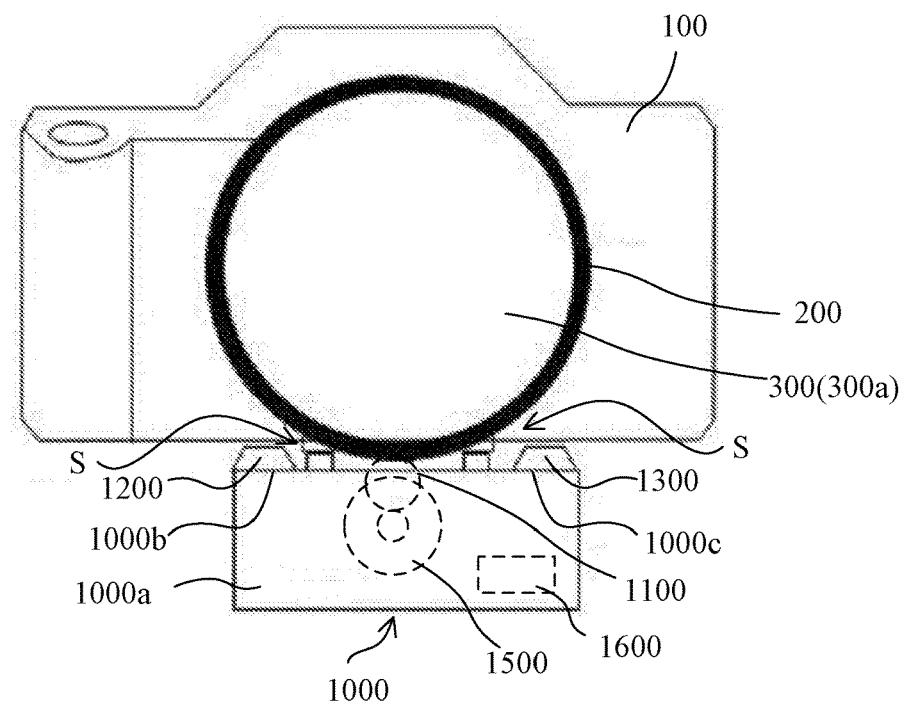
FIGS. 16A and 16B illustrate a configuration of an electric zoom adapter according to the first embodiment of the present invention.
Figure 16B:
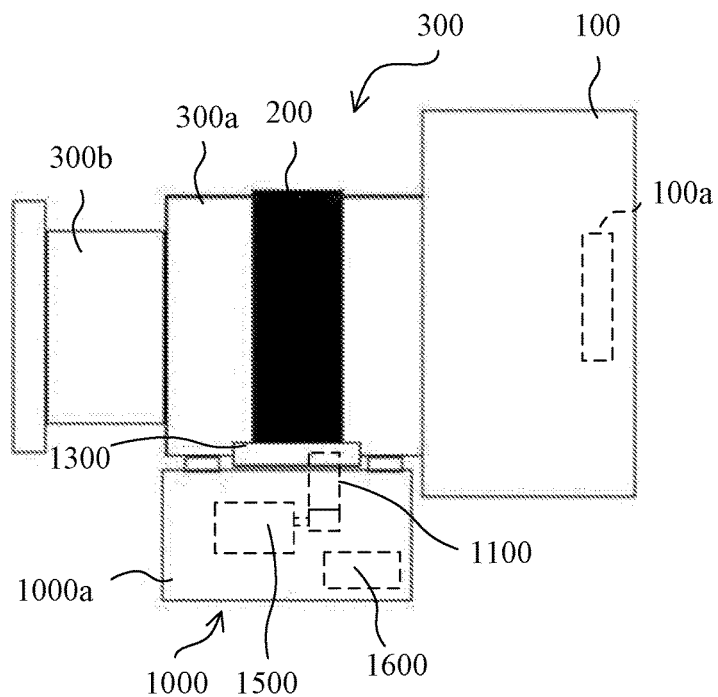

FIGS. 16A and 16B illustrate a configuration of an electric zoom adapter (simply referred to as an "adapter" hereinafter) 1000 as the optical driving apparatus according to a sixth embodiment of the present invention. FIGS. 16A and 16B are a front view (in the optical axis direction) and a side view of the adapter 1000 attached externally to a barrel 300a of the interchangeable lens (optical apparatus) 300 attached to a camera body 100 that includes an image sensor 100a. The barrel 300a in the interchangeable lens 300 includes an unillustrated image capturing optical system. The image capturing optical system includes a plurality of lenses, such as a magnification-varying lens (referred to as a "zoom lens" hereinafter) and a focus lens, and an aperture stop.

A manual zoom ring (simply referred to as a "zoom ring" hereinafter) 200 as a ring member is rotatably provided around the optical axis of the image capturing optical system, on the outer circumference of the barrel 300a. When the user manually rotates the zoom ring 200, the zoom lens is moved in the optical axis direction for magnification-varying (zooming). In this zooming, a front barrel 300b illustrated in FIG. 16B in the barrel 300a is moved back and forth in the optical axis direction. A ring-shaped driven gear is formed on an outer circumference of the zoom ring 200.

The adapter 1000 has a rectangular-parallelepiped body 1000a. The body 1000a is fixed onto the bottom on the outer circumference of the barrel 300a by an unillustrated attachment mechanism. The body 1000a includes a first area 1000b and a second area 1000c on its top surface at mutually different circumferential portions (first and second circumference portions) of the zoom ring 200 on the body side (or the optical driving apparatus side) with respect to the barrel 300a. An aperture (first and second spaces) S which the finger of the user can enter is formed between the first and second areas 1000b and 1000c (or adapter 1000) and the zoom ring 200, as described above.

That the first area 1000b and the second area 1000c face a plurality of circumferential portions means that one of the plurality of circumferential portions and the first area 1000b overlap each other and the other of the plurality of circumferential portions and the second area 1000c overlap each other, when they are viewed from a direction orthogonal to the rotating axis of the zoom ring 200 as illustrated in FIG. 16A.

The body 1000a houses (holds) a motor 1500 as the actuator, and a drive gear 1100 rotated by the rotating force by the motor 1500. The top of the drive gear 1100 upwardly projects from an area between the first and second areas 1000b and 1000c on the top surface of the body 1000a, and is engaged with (contacts) a driven gear of the zoom ring 200. As the motor 1500 rotates, the rotating force from the motor 1500 is transmitted to the zoom ring 200 via the drive gear 1100, and the zoom ring 200 is rotated. The motor 1500 and the drive gear 1100 constitute the driver.

A controller 1600 is configured to control the motor 1500 and is housed in the body 1000*a*. The controller 1600 constitutes a computer including a CPU, etc., and rotates the motor 1500 in accordance with a user operation of the unillustrated zoom switch on the side surface etc. of the body 1000*a*. In this case, the controller 1600 controls a rotating direction of the motor 1500 in accordance with a direction in which the zoom switch is operated among the wide-angle side and the telephoto side, and controls a rotating speed of the motor 1500 in accordance with an operation amount of the zoom switch. Thereby, the interchangeable lens 300 can be zoomed from the adapter 1000 side.

Figure 21:
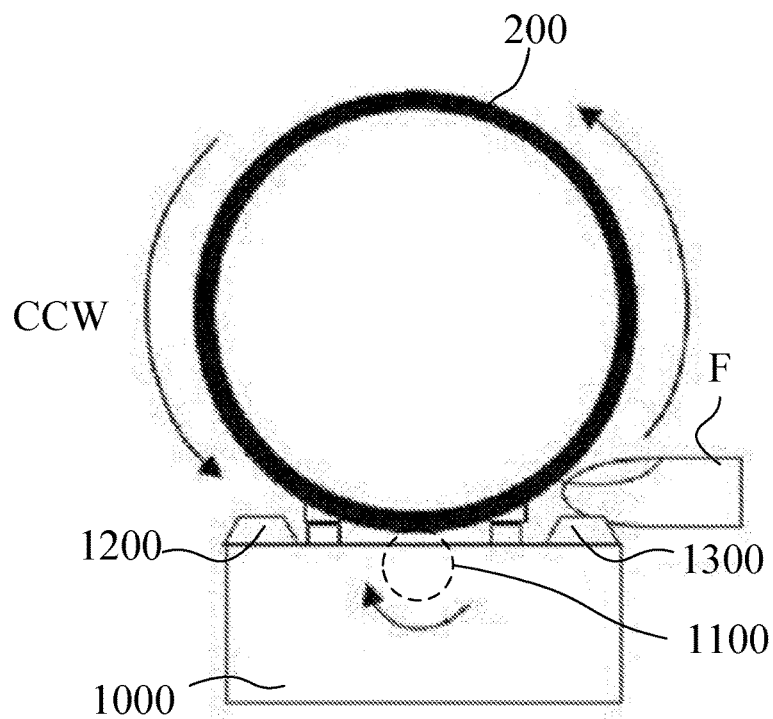
FIG. 21 is a view for explaining another operation of the electric zoom adapter according to the sixth embodiment.

A first finger detection switch (first detector) 1200 is provided on the first area 1000*b* on the body 1000*a*, and a second finger detection switch (second detector) 1300 is provided on the second area 1000*c* on the body 1000*a*. When the finger enters the aperture S and touches the corresponding finger detection switch, as illustrated in FIGS. 17, 18, and 21, the detection signal is input to the controller 1600.

The controller 1600 performs a first control or a second control for the motor 1500, as described later, when the finger detection signal is input to the controller 1600 from one of the first finger detection switch 1200 and the second finger detection switch 1300 when the motor 1500 is rotating the zoom ring 200. The first control and the second control are different from a control before the finger detection signal (finger detection) is input. Whether the first control or the second control is selected based on a relationship between the rotating direction of the zoom ring 200 and the finger detection switch that has sent the finger detection signal among the first and second finger detection switches 1200 and 1300. Moreover, the controller 1600 performs a third control, which will be described later, when both the first and second finger detection switches 1200 and 1300 send the finger detection signals when the motor 1500 is rotating the zoom ring 200.

Figure 17:
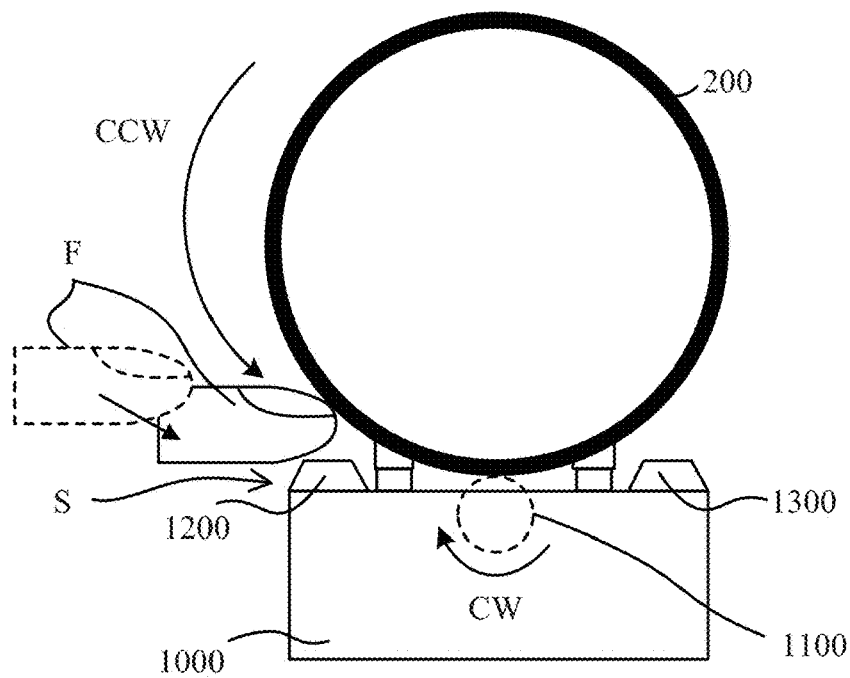
FIG. 17 is a view for explaining an operation of the electric zoom adapter according to a sixth embodiment.
Figure 18:
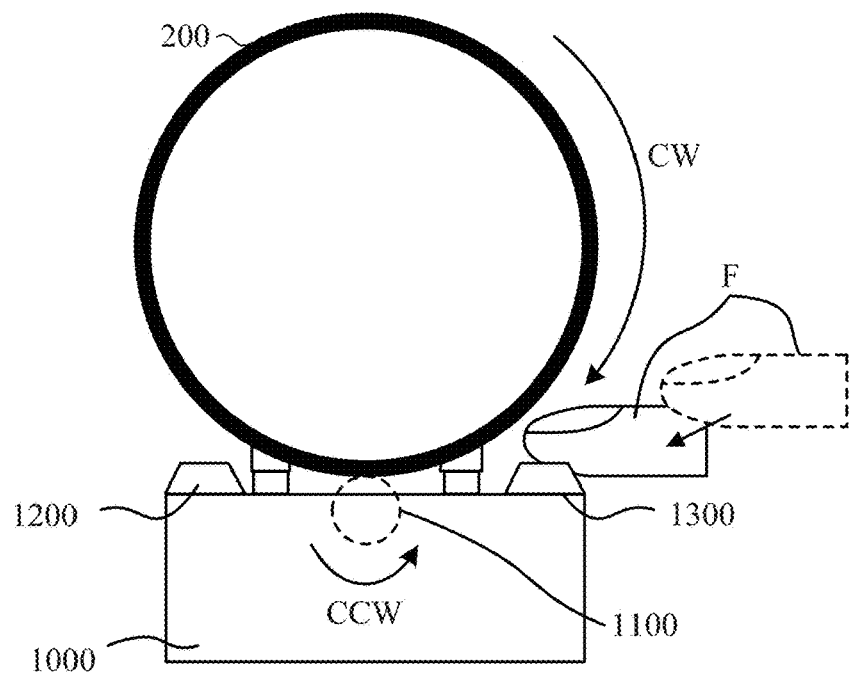
FIG. 18 is a view for explaining another operation of the electric zoom adapter according to the sixth embodiment.

FIGS. 17 and 18 illustrate that the motor 1500 rotate the zoom ring 200 so that the circumferential portion (bottom near the body 1000*a*) in the zoom ring 200 on the body side towards one of the first and second finger detection switches 1200 and 1300. The first control is performed in this state when the finger detection signal is input from the one of the detection switches. In this case, the controller 1600 controls the motor 1500 so as to reversely rotate the zoom ring 200 in accordance with the finger detection signal from the one of the detection switches.

For example, FIG. 17 illustrates a front surface view in which the zoom ring 200 is rotated counterclockwise (CCW) corresponding to the wide-angle side or the zoom ring 200 rotates towards the first finger detection switch 1200 as the above "one of the finger detection switches." At this time, the motor 1500 omitted in FIG. 17 rotates the drive gear 1100 clockwise (CW). When the finger F that has entered the space S above the first finger detection switch 1200 touches the first finger detection switch 1200, the finger detection signal from the first finger detection switch 1200 is input to the controller 1600.

FIG. 18 illustrates the front surface view in which the zoom ring 200 is rotated counterclockwise (CW) corresponding to the telephoto side or the zoom ring 200 rotates towards the second finger detection switch 1300 as the above "one of the finger detection switches." At this time, the motor 1500 omitted in FIG. 18 rotates the drive gear 1100 counterclockwise (CCW). When the finger F that has entered the space S above the second finger detection switch 1300 touches the second finger detection switch 1300, the finger detection signal from the second finger detection switch 1300 is input to the controller 1600.

When the zoom ring 200 continues to rotate in the same direction in the state illustrated in FIGS. 17 and 18, the finger F may be jammed between the zoom ring 200 and the top surface of the body 1000*a*. Therefore, the first control controls the motor 1500 so as to reversely rotate the zoom ring 200 for a predetermined time period or by a predetermined rotating amount, and to prevent the finger F from being jammed between the zoom ring 200 and the body 1000*a*. After the reverse rotation for the predetermined time period or by the predetermined rotation amount, the motor 1500 is stopped. When the finger detection signal from none of the first and second detection switches 1200 and 1300 is input, the motor 1500 is driven so as to rotate the zoom ring 200 in a rotating direction before the reverse rotation (or towards the operated side of the zoom switch).

As illustrated in FIG. 21, the second control is performed when the motor 1500 rotates the zoom ring 200 towards one of the first and second finger detection switches 1200 and 1300, and the finger detection signal is input from the other of the first and second finger detection switches. In this case, the controller 1600 controls the motor 1500 so as to stop rotating or decelerate the zoom ring 200 in accordance with the finger detection signal from the other finger detection switch.

When the zoom ring 200 continues to rotate in the same direction in the state illustrated in FIG. 21, the finger F may be caught by the zoom ring 200 and undesirably repelled. Hence, the second control controls the motor 1500 so as to stop rotating or slowly rotate the zoom ring 200, and prevents the finger F from being undesirably repelled by the zoom ring 200. The motor 1500 controlled so as to stop the zoom ring 200 may send a command for stop rotating the motor 1500 or may not send the command to the motor 1500 at all.

Figure 22:
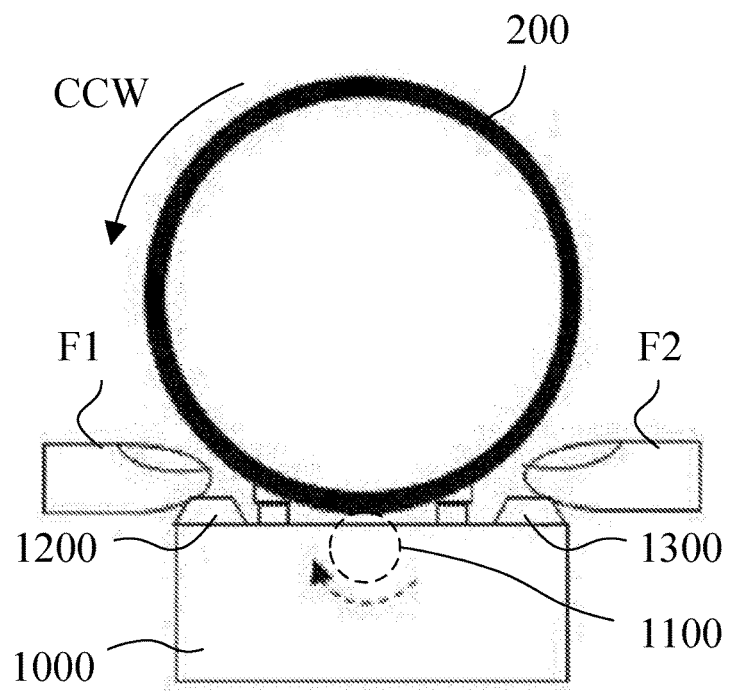
FIG. 22 is a view for explaining still another operation of the electric zoom adapter according to the sixth embodiment.

As illustrated in FIG. 22, the third control is performed when the finger detection signals are input from both the first and second detection switches 1200 and 1300, irrespective of the rotating direction of the zoom ring 200 by the motor 1500. For example, when the zoom ring 200 rotates towards the first finger detection switch 1200, a finger F1 touching the first finger detection switch 1200 may be jammed between the zoom ring 200 and the body 1000*a*. A finger F2 touching the second finger detection switch 1300 may be undesirably repelled by the zoom ring 200. Hence, the third control performed by the controller 1600 stops the motor 1500 and the zoom ring 200 in accordance with the finger detection signals from both the detection switches 1200 and 1300.

Figure 19:
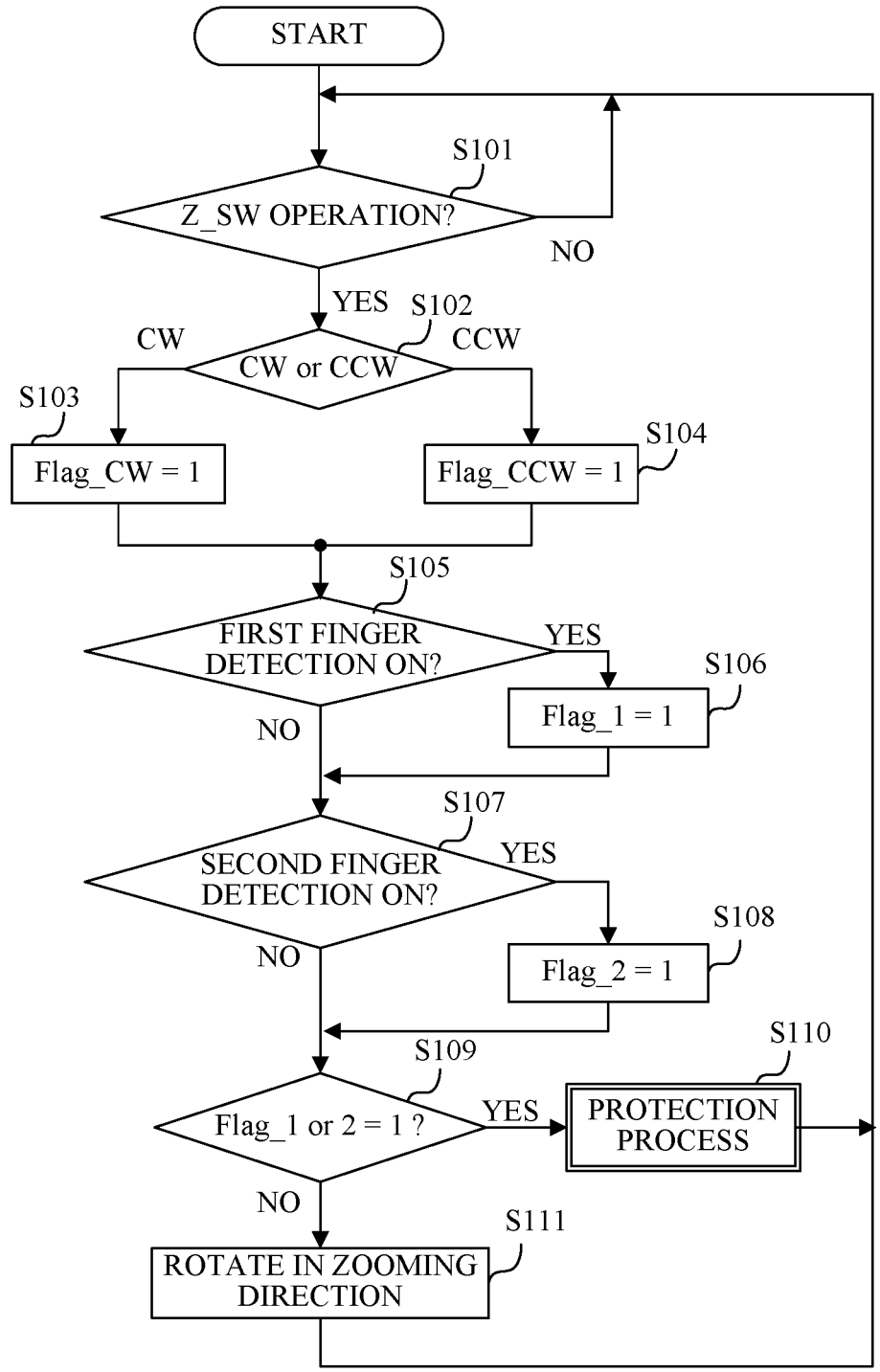
FIG. 19 is a flowchart of a control in the electric zoom adapter according to the sixth embodiment.

The flowchart in FIG. 19 illustrates a control process of the motor 1500 performed by the motor 1600. The controller 1600 executes this process in accordance with a zoom driving program (optical driving program) as a computer program.

In the step S101, the controller 1600 stands by until the user operates the zoom switch. When the zoom switch is operated, the controller 1600 that has moved to the step S102 determines the zoom switch operating direction or which of the wide-angle side (CCW) or the telephoto side (CW) the zoom switch is operated to. In other words, the controller 1600 detects a rotating direction of the zoom ring 200. When the zoom switch is operated to the telephoto side, the controller 1600 writes 1 in an extension flag (Flag_CW) in the step S103, and moves to the step S105. When the zoom switch is operated to the wide-angle side, the controller 1600 writes 1 in a retraction flag (Flag_CCW) in the step S104, and moves to the step S105.

In the step S105, the controller 1600 confirms whether the finger detection signal is input from the first finger detection switch 1200. When the finger detection signal is input from the first finger detection switch 1200, the controller 1600 moves to the step S106 to write 1 in Flag_1 and moves to the step S107. When the finger detection signal is not input from the first finger detection switch 1200, the flow moves to the step S107.

In the step S107, the controller 1600 confirms whether the finger detection signal is input from the second finger detection switch 1300. When the finger detection signal is input from the second finger detection switch 1300, the controller 1600 moves to the S108, writes 1 in Flag_2, and moves to the step S109. When the finger detection signal is not input from the second finger detection switch 1300, the flow moves to the step S109.

In the step S109, the controller 1600 confirms whether at least one of Flag_1 and Flag_2 is 1, and if so moves to the step S110. If neither Flag_1 nor Flag_2 is 1, the controller 1600 moves to the step S111 and drives the motor 1500 so as to rotate the zoom ring 200 in the zoom switch operating direction. Thereafter, the controller 1600 returns to the step S101 and repeats the process from the step S101.

When the finger detection signal is input from at least one of the first and second finger detection switches 1200 and 1300 in the step S109 and at least one of Flag_1 and Flag_2 and becomes 1, while the motor 1500 is being rotated, the controller 1600 moves to the step S110.

Referring now to the flowchart illustrated in FIG. 20, a description will be given of a protection process performed by the controller 1600 in the step S110. A description will now be given of the process performed by the controller 1600, where the flow moves to the step S110 while the motor 1500 is rotating the zoom ring 200.

In the step S110-1, the controller 1600 confirms whether both Flag_1 and Flag_2 are 1. When both Flag_1 and Flag_2 are 1, the controller 1600 moves to the step S110-2 and stops the motor 1500 in the third control. When either Flag_1 or Flag_2 is not 1, the controller 1600 moves to the step S110-3.

In the step S110-3, the controller 1600 confirms whether Flag_1 is 1. When Flag_1 is 1, the controller 1600 moves to the step S110-4, and determines whether Flag_CCW is 1 (or whether the zoom ring 200 is being rotated towards the first detection switch 1200). When Flag_CCW is 1, the controller 1600 moves to the step S110-5 so as to reversely rotate the motor 1500 for a predetermined time period or by a predetermined rotating amount in the first control. Then, the controller 1600 moves to the step S110-10. On the other hand, when Flag_CCW is not 1 (or while the zoom ring 200 is being rotated towards the second detection switch 1300), the controller 1600 moves to the step S110-6 so as to stop or decelerate the motor 1500 in the second control. Then, the flow moves to the step S110-10.

On the other hand, when Flag_1 is not 1 in the step S110-3 (or Flag_2 is 1), the controller 1600 moves to the step S110-7 and determines whether Flag_CW is 1 (or whether the zoom ring 200 is being rotated towards the second detection switch 1300). When Flag_CW is 1, the controller 1600 moves to the step S110-8 and reversely rotates the motor 1500 for a predetermined time period or by a predetermined rotating amount in the first control. Then, the flow moves to the step S110-10. On the other hand, when Flag_CW is not 1 (or while the zoom ring 200 is being rotated towards the first detection switch 1200), the control-ler 1600 moves to the step S110-9, and stops or decelerates the motor 1500 in the second control. Then, the flow moves to the step S110-10.

In the step S110-10, the controller 1600 displays a warning message that the finger F enters the space S. An audio warning may also be performed. The controller 1600 that ends the process of the step S110 returns to the step S101.

Figure 20:
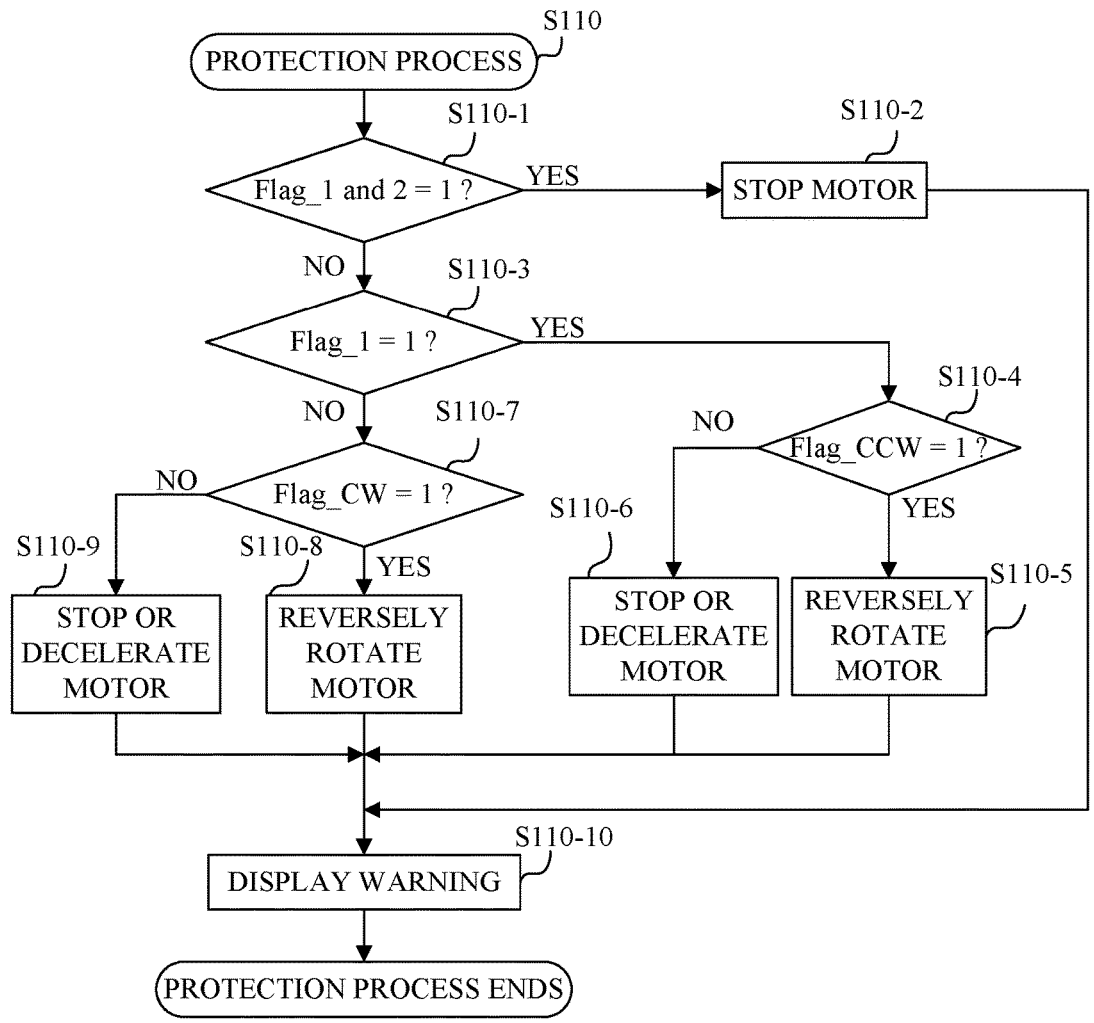
FIG. 20 is a flowchart of a state detection process in FIG. 19.

When the motor 1500 has not yet rotated and the flow moves to the step S110, the controller 1600 instructs the motor 1500 not to start rotating, although it is not illustrated in FIG. 20.

As described above, this embodiment detects the finger that has entered the space between the zoom ring 200 and the body 1000a and controls the motor 1500 so as to reversely rotate, stop or decelerate the zoom ring 200. This configuration can prevent the finger from being jammed between the zoom ring 200 and the body 1000a or from being undesirably repelled by the zoom ring 200.

Seventh Embodiment

Figure 23:
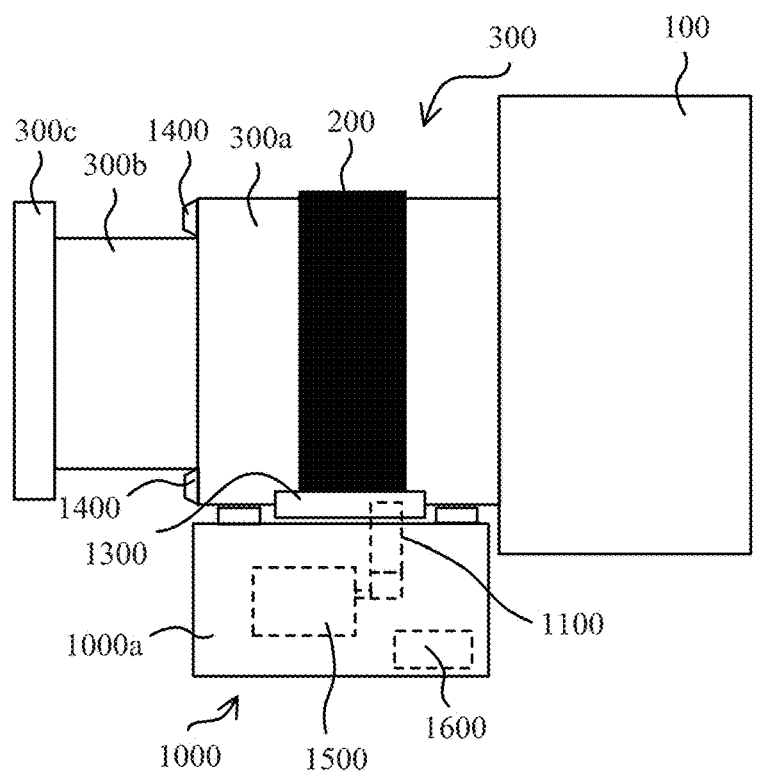
FIG. 23 is a view of a configuration of an electric zoom adapter according to a seventh embodiment.

FIG. 23 illustrates a configuration of an adapter 1000 according to a seventh embodiment of the present invention, and the interchangeable lens 300 and the camera body 100 to which the adapter 1000 is attached when they are viewed from the side surface. The configuration of the adapter 1000, the interchangeable lens 300, and the camera body 100 are similar to that of the sixth embodiment, and common elements are designated by the same reference numerals.

Similar to the sixth embodiment, this embodiment provides the first and second finger detection switches 1200 and 1300 (although FIG. 23 illustrates only reference numeral 1300) to the adapter 1000, and a plurality of third finger detection switches 1400 on the front end surface of the barrel (first barrel) 300a in the interchangeable lens 300. The third finger detection switch 1400 detects the finger inserted into a space between the front end surface of the barrel 300a and the flange 300c. The flange 300c is provided on the front end portion of the front barrel (second barrel) 300b that extends and retracts in the optical axis direction in the barrel 300a, and the flange 300c externally projects from the front barrel (second barrel) 300b in the radial direction.

Figure 24:
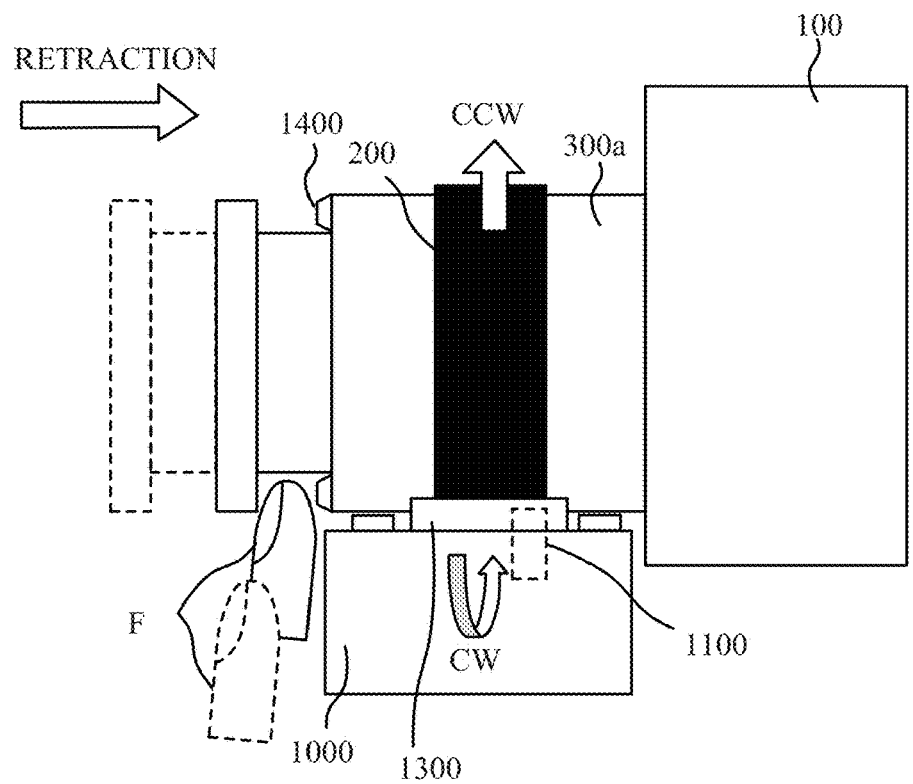
FIG. 24 is a view for explaining an operation of the electric zoom adapter according to the seventh embodiment.

As illustrated in FIG. 24, when the finger F touches the third finger detection switch 1400, the third finger detection switch 1400 outputs the finger detection signal to the controller 1600. The controller 1600 performs a fourth or fifth control in accordance with the input of the finger detection signal from the third finger detection switch 1400. Whether the first or second control is performed is selected based on the rotating direction of the zoom ring 200.

Figure 25:
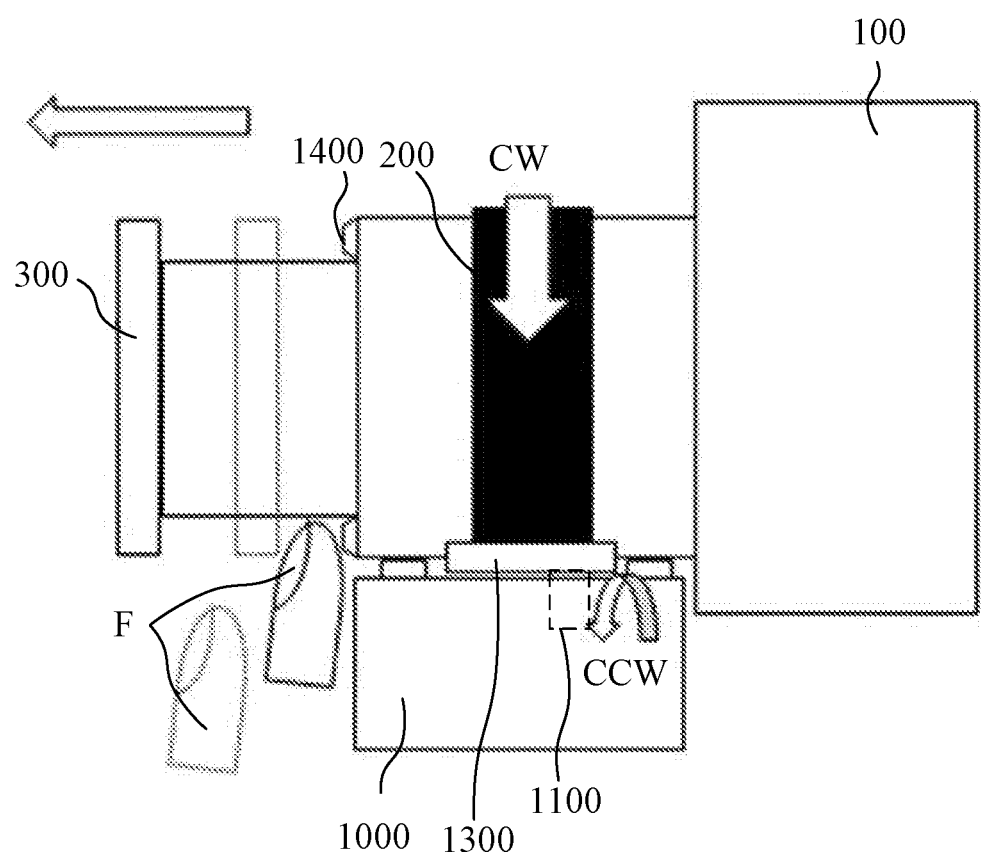
FIG. 25 is a view for explaining another operation of the electric zoom adapter according to the seventh embodiment.

When this embodiment rotates the zoom ring 200 towards the first finger detection switch 1200, as illustrated in FIG. 17, the front barrel 300b retracts from the barrel 300a, as illustrated in FIG. 24. In other words, the flange 300c of the front barrel 300a approaches to the front end surface of the barrel 300a. On the contrary, when the zoom ring 200 rotates towards the second finger detection switch 1300, as illustrated in FIG. 18, the front barrel 300b projects from the barrel 300a, as illustrated in FIG. 25.

As illustrated in FIG. 24, when the front barrel 300b retracts from the barrel 300a and the finger F enters the space between the front end surface of the barrel 300a and the flange 300c of the front barrel 300b, the finger F may be jammed there. Thus, when the front barrel 300b retracts and the controller 1600 receives an input of the finger detection signal from the third finger detection switch 1400, the controller 1600 performs the fourth control for the motor

1500 so as to reversely rotate the zoom ring 200 for a predetermined time period of by a predetermined rotating amount similar to the first control. This configuration can prevent the finger F from being jammed in the space between the flange 300c of the front barrel 300b and the front end surface of the barrel 300a.

On the other hand, when the front barrel 300b extends from the barrel 300a and the finger F enters the space between the front end surface of the barrel 300a and the flange 300c of the front barrel 300b, the finger F may be undesirably drawn ahead by the extending front barrel 300b. Thus, the controller 1600 controls the motor 1500 so as to stop or decelerate the zoom ring 200 similar to the second control, when the finger detection signal is input to the controller 1600 from the third finger detection switch 1400 while the front barrel 300b is extending. This configuration can prevent the finger F from being drawn by the front barrel 300b.

Figure 26:
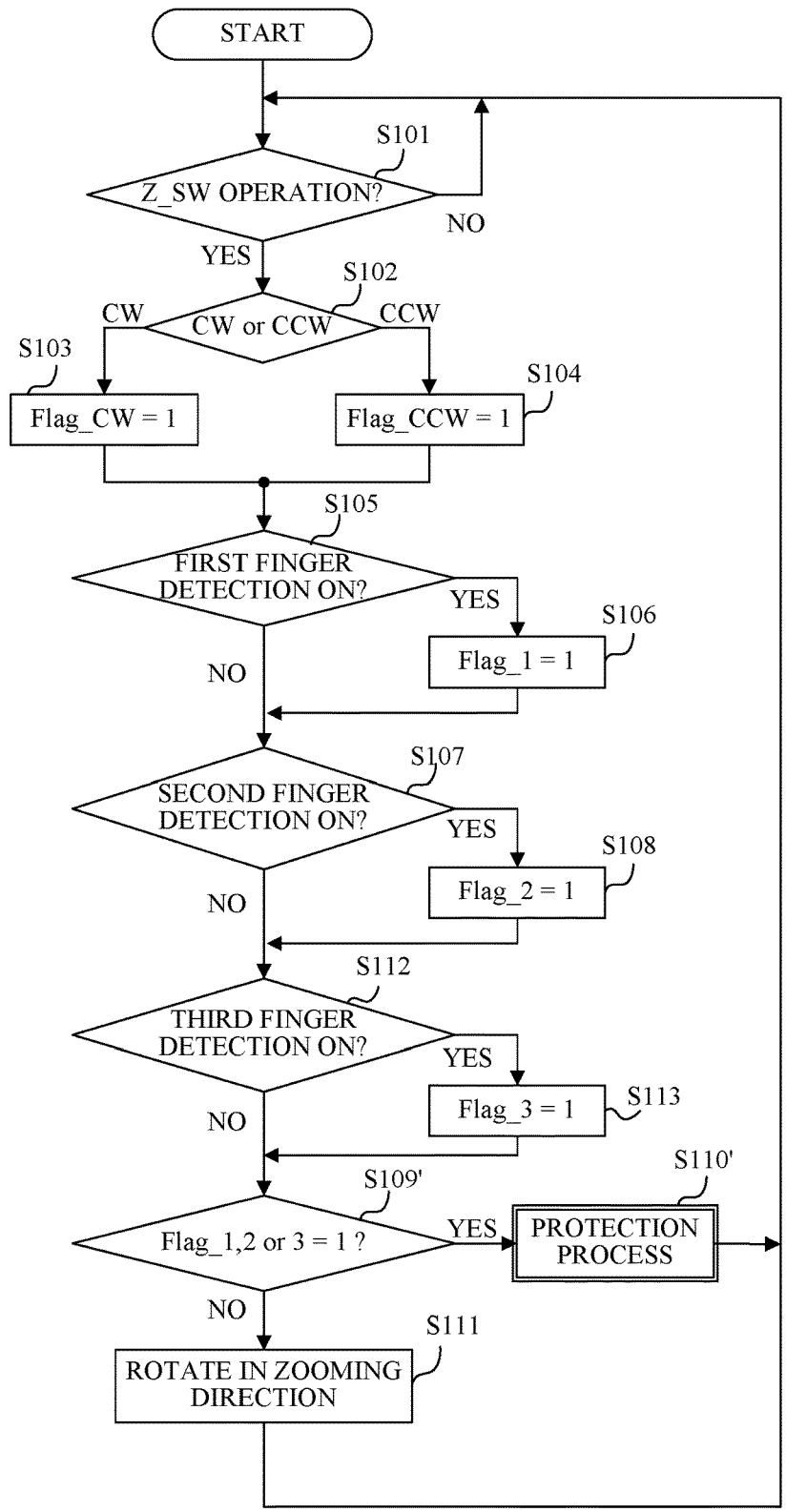
FIG. 26 is a flowchart of a control in the electric zoom adapter according to the seventh embodiment.

The flowchart illustrated in FIG. 26 illustrates a control process of the controller 1600 for the motor 1500. Those steps in FIG. 26, which are corresponding steps in FIG. 19 in the sixth embodiment, will be designated by the same step numerals as those in FIG. 19.

S101 to S108 in FIG. 26 are the same as S101 to S108 in FIG. 19. When the finger detection signal is not input from the second finger detection switch 1300 in the step S107, the controller 1600 moves to the step S112 and confirms whether the finger detection signal is input from the third finger detection switch 1400. When the finger detection signal is input from the third finger detection switch 1400, the controller 1600 moves to S113, writes 1 in Flag_3, and moves to the step S109'. When the finger detection signal is not input from the third finger detection switch 1400, the flow moves to the step S109'.

In the step S109', the controller 1600 confirms whether at least one of Flag_1, Flag_2, and Flag_3 is 1, and if so moves to the step S110'. When none of Flag_1 to Flag_3 is 1, the controller 1600 moves to the step S111. When the motor 1500 rotates in the step S111, the controller 1600 returns to the step S101, and repeats the process from the step S101. The controller 1600 moves to the step S110', when the finger detection signal is input from any one of the first to third finger detection switches 1200 to 1400 in the step S109' while the motor 1500 is rotating and when at least one of Flag_1 to Flag_3 is 1.

Figure 27:
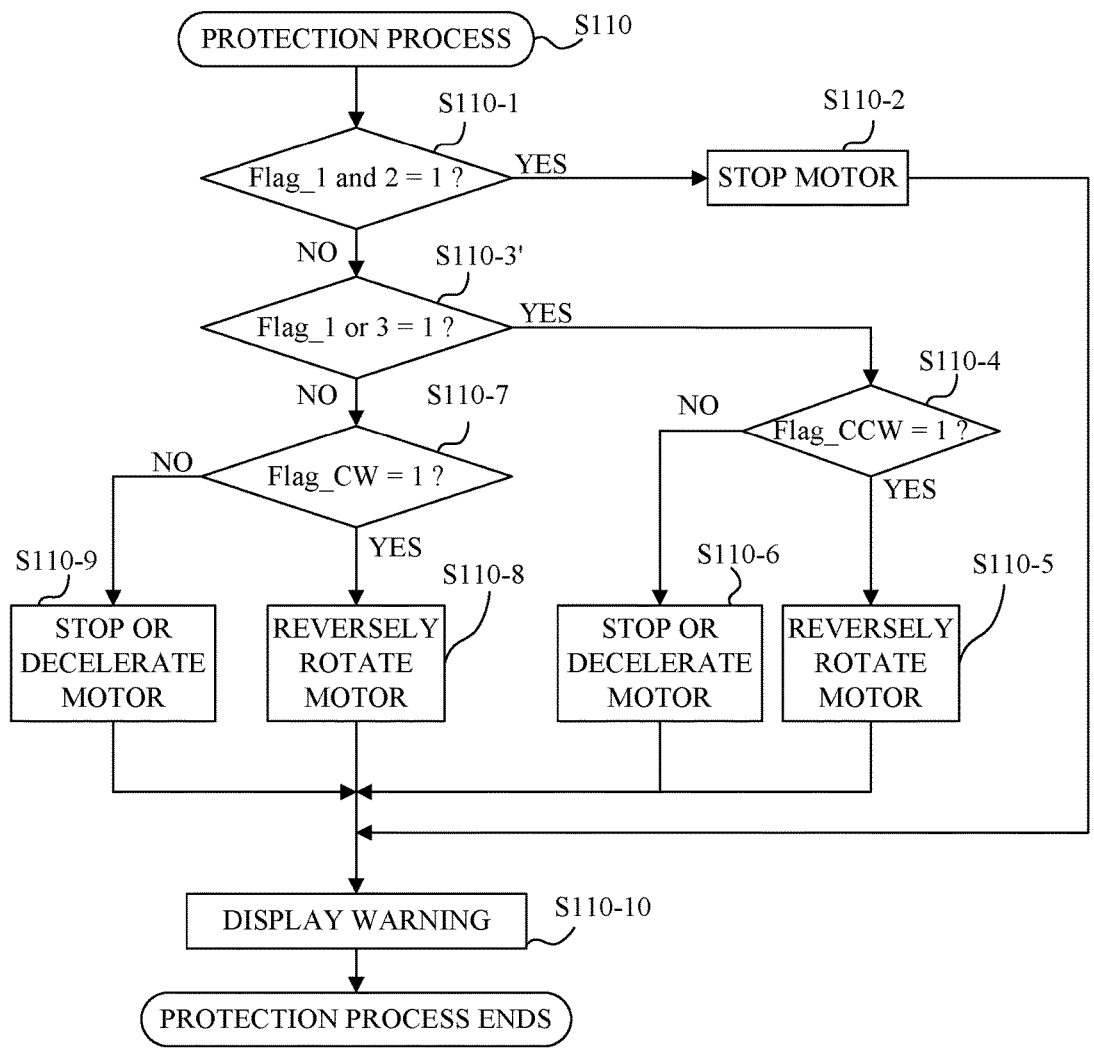
FIG. 27 is a flowchart of a state detection process in FIG. 26.

The flowchart in FIG. 27 illustrates a protection process performed in the step S110' in FIG. 26. Those steps in FIG. 27, which are corresponding steps in FIG. 20, will be designated by the same step numerals. Herein, a description will be given of the process performed by the controller 1600 in the step S110' when the motor 1500 is rotating the zoom ring 200.

The steps S110-1 and S110-2 are the same as the steps S110-1 and S110-2 in FIG. 20. When Flag_1 or Flag_2 is not 1 in the step S110-1, the controller 1600 moves to the step S110-3'.

In the step S110-3', the controller 1600 confirms whether Flag_1 or Flag_3 is 1. When Flag_1 or Flag_3 is 1, the controller 1600 moves to the step S110-4. Herein, the controller 1600 determines whether Flag_CCW is 1 (or whether the zoom ring 200 is rotated towards the first detection switch 1200 and the front barrel 300b is being retracted).

When Flag_CCW is 1, the controller 1600 moves to the step S110-5 so as to reversely rotate the motor 1500 for a predetermined time period or by a predetermined rotating amount. In other words, the controller 1600 performs the first control and the fourth control and moves to the step S110-10. On the other hand, when Flag_CCW is not 1 (or when the zoom ring 200 is rotated towards the second detection switch 1300 and when the front barrel 300b is being extended), the controller 1600 moves to the step S110-6 so as to stop or decelerate the motor 1500. In other words, the controller 1600 performs the second control and the fifth control, and moves to the step S110-10.

When Flag_1 or Flag_3 is not 1 in the step S110-3' (or when Flag_2 is 1), the controller 1600 moves to the step S110-7. The steps S110-7 to S110-10 are the same as the steps S110-7 to S110-10 in FIG. 20.

When the flow moves to the step S110' while the motor 1500 has not yet started rotating, the controller 1600 prohibits the motor 1500 from rotating although it is not illustrated in FIG. 27.

As described above, this embodiment detects the finger that has entered the space between the zoom ring 200 and the body 1000a, similar to the sixth embodiment, and controls the motor 1500 so as to reversely rotate, stop, or decelerate the zoom ring 200. This configuration can prevent the finger from being jammed between the zoom ring 200 and the body 1000a or from being undesirably repelled due to the zoom ring 200. In addition, this embodiment detects the finger that has entered the space between the front end surface of the barrel 300a and the flange 300c of the front barrel 300b, and controls the motor 1500 so as to reversely rotate, stop, or decelerate the zoom ring 200. This configuration can prevent the finger from being jammed between the front end surface of the barrel 300a and the flange 300c of the front barrel 300b or from being undesirably drawn by the moving front barrel 300b.

Each of the sixth and seventh embodiments controls the motor 1500 so as to reversely rotate, stop, or decelerate the motor 1500 and consequently the zoom ring 200 in accordance with the finger detection signal where the motor 1500 directly rotates the zoom ring 200 only through the drive gear 1100. However, a transmission mechanism may be provided between the motor 1500 and the drive gear 1100 and configured to switch a direction or speed of a rotation transmitted from the motor 1500 rotating at a uniform speed in a predetermined direction to the drive gear 1100 or configured to cut the transmission of the rotation between the rotating motor 1500 and the drive gear 1100. In this case, rather than the motor 1500, the zoom ring 200 can be reversely rotated, stopped, or decelerated by controlling a switch actuator configured to switch the transmission mechanism. In other words, when the driver includes the motor 1500, the drive gear 1100, the transmission mechanism, and the switch actuator, the controller 1600 may control the switch actuator in accordance with the finger detection signal.

While each of the sixth and seventh embodiments describes use of the finger detection signal output by the finger contact as the finger detection switch (1200 to 1400), the finger may be detected by a noncontact manner by using light etc. Moreover, a thermosensitive sensor may detect the finger.

While each of the sixth and seventh embodiments describes use of a switch configured to detect the finger of the user the object, another object, such as a rod, may be detected. In other words, the detector according to the present invention is not limited to the detector configured to detect only the finger.

While each of the sixth and seventh embodiments describes the adapter 1000 attached to the interchangeable lens 300, the adapter 1000 may be attached to the lens integrated type image capturing apparatus (optical apparatus).

Each of the sixth and seventh embodiments can control driving of the ring member by detecting the object, such as the finger inserted into the space between the optical driving apparatus the ring member on the barrel side (such as reversely rotate, stop, or decelerate the ring member). This configuration can prevent the finger from being jammed between the rotating ring member and the body or from being undesirably repelled by the rotating ring member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-239347, filed on Dec. 8, 2015 and 2015-239346, filed on December 8, which are hereby incorporated by reference herein in their entirety.

What is claimed is:

1. An optical driving apparatus externally attachable to an optical apparatus having a lens barrel and a ring member that is rotatable on an outer circumference of the lens barrel, the optical driving apparatus comprising:
a driver configured to rotate the ring member;
a detector configured to detect an object that has entered a space between an outer circumference portion of the ring member and the optical driving apparatus; and
a controller configured to control the driver in response to a detection of the object by the detector when the driver is rotating the ring member,
wherein the detector has a contacted portion that extends in a first direction corresponding to an optical axis direction of the lens barrel and to which the object is contactable, and detects the object when the object presses against the contacted portion.

2. The optical driving apparatus according to claim 1, wherein the detector detects the object when the contacted portion is pressed with a force or a pressure larger than a predetermined value.

3. The optical driving apparatus according to claim 1, wherein the detector includes a pressure detector.

4. The optical driving apparatus according to claim 1, wherein the detector includes a contact switch.

5. The optical driving apparatus according to claim 1, wherein the contacted portion is wider than the ring member in the first direction.

6. The optical driving apparatus according to claim 1, wherein the contacted portion is rotatable around an axis that extends in the first direction.

7. The optical driving apparatus according to claim 6, wherein the contacted portion includes an outer portion closer to a side surface of the optical driving apparatus in a second direction orthogonal to the first direction, and an inner portion farther from the side surface than the outer portion,
wherein the axis that extends in the first direction is provided onto the inner portion, and
wherein the outer portion pressed by the object rotates so as to separate from the ring member.

8. The optical driving apparatus according to claim 6, wherein the contacted portion includes an outer portion closer to a side surface of the optical driving apparatus in a second direction orthogonal to the first direction, and an inner portion farther from the side surface than the outer portion,
wherein the axis that extends in the first direction is provided onto the outer portion, and
wherein the inner portion pressed by the object rotates so as to separate from the ring member.

9. The optical driving apparatus according to claim 1, wherein the contacted portion is linearly movable relative to the optical driving apparatus.

10. The optical driving apparatus according to claim 1, wherein the optical driving apparatus is provided so that the space includes a first space and a second space that are formed between the lens barrel and mutually different outer circumferential portions of the ring member, and
wherein the detector includes a first detector configured to detect the object that has entered the first space and a second detector configured to detect the object that has entered the second space.

11. An optical apparatus comprising:
a lens barrel;
a ring member that is rotatable on an outer circumference of the lens barrel; and
an optical driving apparatus externally attached to the optical apparatus,
wherein the optical driving apparatus includes:
a driver configured to rotate the ring member;
a detector configured to detect an object that has entered a space between an outer circumference portion of the ring member and the optical driving apparatus; and
a controller configured to control the driver in response to a detection of the object by the detector when the driver is rotating the ring member,
wherein the detector has a contacted portion that extends in a first direction corresponding to an optical axis direction of the lens barrel and to which the object is contactable, and detects the object when the object presses against the contacted portion.

12. An optical driving apparatus externally attachable to an optical apparatus having a lens barrel and a ring member that is rotatable on an outer circumference of the lens barrel, the optical driving apparatus comprising:
a driver configured to rotate the ring member;
a first detector configured to detect an object that has entered a first space between the optical driving apparatus and a first outer circumferential portion of the ring member;
a second detector configured to detect the object that has entered a second space between the optical driving apparatus and a second outer circumferential portion of the ring member, the first and second detectors each having a contacted portion that extends in a first direction corresponding to an optical axis direction of the lens barrel and to which the object is contactable; and
a controller configured to control the driver, in response to a detection of the object by at least one of the first and second detectors when the driver is rotating the ring member, depending on a rotating direction of the ring member and on the at least one detector having detected the object.

13. The optical driving apparatus according to claim 12, wherein the controller controls the driver, when the driver is rotating the ring member in a direction in which an optical driving apparatus-side circumference portion of the ring member is rotated from a side of one of the first and second detectors to a side of the other of the first and second detectors, in response to the detection of the object by the one detector, so as to reversely rotate the ring member.

14. The optical driving apparatus according to claim 12, wherein the controller controls the driver, when the driver is rotating the ring member in a direction in which an optical driving apparatus-side circumference portion of the ring member is rotated from a side of one of the first and second detectors to a side of the other of the first and second detectors, in response to the detection of the object by the other detector, so as to stop rotating or decelerate the ring member.

15. The optical driving apparatus according to claim 12, wherein the controller controls the driver, when the driver is rotating the ring member in a direction in which an optical driving apparatus side circumference portion of the ring member is rotated from a side of one of the first and second detectors to a side of the other of the first and second detectors, in response to the detection of the object by both the first and second detectors, so as to stop rotating the ring member.

16. The optical driving apparatus according to claim 12, wherein the lens barrel includes a first barrel, and a second barrel configured to move relative to the first barrel in an extension or retraction direction depending on a rotating direction of the ring member,
wherein the optical driving apparatus further includes a third detector configured to detect the object between the first barrel and the second barrel, and
wherein the controller controls the driver depending on the rotating direction of the ring member, in response to a detection of the object by the third detector, when the driver is rotating the ring member.

17. The optical driving apparatus according to claim 16, wherein the controller controls the driver, in response to the detection of the object by the third detector when the driver is rotating the ring member in the retraction direction of the second barrel relative to the first barrel, so as to reversely rotate the ring member.

18. The optical driving apparatus according to claim 16, wherein the controller controls the driver, in response to the detection of the object by the third detector when the driver is rotating the ring member in the extension direction of the second barrel relative to the first barrel, so as to stop rotating or deteriorate the ring member.

19. An optical apparatus comprising:
a lens barrel;
a ring member that is rotatable on an outer circumference of the lens barrel; and
an optical driving apparatus externally attached to the optical apparatus,
wherein the optical driving apparatus includes:
a driver configured to rotate the ring member;
a first detector configured to detect an object that has entered a first space between the optical driving apparatus and a first outer circumferential portion of the ring member;
a second detector configured to detect the object that has entered a second space between the optical driving apparatus and a second outer circumferential portion of the ring member, the first and second detectors each having a contacted portion that extends in a first direction corresponding to an optical axis direction of the lens barrel and to which the object is contactable; and
a controller configured to control the driver, in response to a detection of the object by at least one of the first and second detectors when the driver is rotating the ring member, depending on a rotating direction of the ring member and on the at least one detector having detected the object.

20. A non-transitory computer-readable storage medium configured to store a computer program for an optical driving apparatus externally attachable to an optical apparatus having a lens barrel and a ring member that is rotatable on an outer circumference of the lens barrel, the optical driving apparatus including a driver configured to rotate the ring member, a first detector configured to detect an object that has entered a first space between the optical driving apparatus and a first outer circumferential portion of the ring member, and a second detector configured to detect the object that has entered a second space between the optical driving apparatus and a second outer circumferential portion of the ring member, the first and second detectors each having a contacted portion that extends in a first direction corresponding to an optical axis direction of the lens barrel and to which the object is contactable, the computer program enables the computer to:
control the driver so as to make the driver rotate the ring member; and
control the driver, in response to a detection of the object by at least one of the first and second detectors when the driver is rotating the ring member, depending on a rotating direction of the ring member and on the at least one detector having detected the object.

* * * * *